US010518501B2

(12) United States Patent
Sonoda et al.

(10) Patent No.: US 10,518,501 B2
(45) Date of Patent: *Dec. 31, 2019

(54) ANTIREFLECTION FILM AND OPTICAL MEMBER

(71) Applicant: FUJIFILM Corporation, Tokyo (JP)

(72) Inventors: Shinichiro Sonoda, Kanagawa (JP); Tatsuya Yoshihiro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 245 days.

This patent is subject to a terminal disclaimer.

(21) Appl. No.: 15/682,782

(22) Filed: Aug. 22, 2017

(65) Prior Publication Data
US 2017/0348944 A1 Dec. 7, 2017

Related U.S. Application Data

(63) Continuation of application No. PCT/JP2016/001015, filed on Feb. 25, 2016.

(30) Foreign Application Priority Data

Feb. 27, 2015 (JP) .................................. 2015-038974

(51) Int. Cl.
*B32B 3/30* (2006.01)
*B32B 7/02* (2019.01)
(Continued)

(52) U.S. Cl.
CPC .................. *B32B 3/30* (2013.01); *B32B 7/02* (2013.01); *B32B 9/00* (2013.01); *B32B 15/20* (2013.01); *G02B 1/115* (2013.01); *G02B 1/118* (2013.01)

(58) Field of Classification Search
None
See application file for complete search history.

(56) References Cited

U.S. PATENT DOCUMENTS

2006/0199040 A1 9/2006 Yamada et al.
2007/0146868 A1 6/2007 Yamaguchi
(Continued)

FOREIGN PATENT DOCUMENTS

JP 2005-275372 A 10/2005
JP 2007-171735 A 7/2007
(Continued)

OTHER PUBLICATIONS

Japanese Notification of Reasons for Refusal for Japanese Application No. 2017-501948, dated Apr. 3, 2018, with English translation.
(Continued)

*Primary Examiner* — Derek S. Chapel
(74) *Attorney, Agent, or Firm* — Birch, Stewart, Kolasch & Birch, LLP

(57) ABSTRACT

An antireflection film includes an uneven structure layer that has an uneven structure in which a distance between protrusions is shorter than a wavelength of light of which reflection is to be suppressed and has an alumina hydrate as a main component, and an intermediate layer that is disposed between the uneven structure layer and a substrate. The uneven structure layer has a spatial frequency peak value of the uneven structure of 6.5 $\mu m^{-1}$ or greater and a film thickness of 250 nm or more, and the intermediate layer is constituted of a plurality of layers including at least a first layer, a second layer, a third layer, a fourth layer, a fifth layer, a sixth layer, a seventh layer, and an eighth layer in this order from the uneven structure layer side to the substrate side.

18 Claims, 17 Drawing Sheets

(51) Int. Cl.
  *B32B 9/00* (2006.01)
  *B32B 15/20* (2006.01)
  *G02B 1/115* (2015.01)
  *G02B 1/118* (2015.01)

(56) References Cited

U.S. PATENT DOCUMENTS

| 2009/0032098 A1* | 2/2009 | Lu ..................... C03C 17/3417 |
| | | 136/257 |
| 2013/0250421 A1 | 9/2013 | Wakabayashi et al. |
| 2014/0016204 A1 | 1/2014 | Hakuta et al. |
| 2015/0219798 A1 | 8/2015 | Sonoda et al. |
| 2015/0219799 A1 | 8/2015 | Sonoda et al. |
| 2017/0151754 A1* | 6/2017 | Yoshihiro ................. B32B 7/02 |
| 2017/0343705 A1* | 11/2017 | Yoshihiro ................. B32B 7/02 |

FOREIGN PATENT DOCUMENTS

| JP | 2008-129153 A | 6/2008 |
| JP | 2012-27322 A | 2/2012 |
| JP | 2012-198330 A | 10/2012 |
| JP | 2013-47780 A | 3/2013 |
| JP | 2013-228688 A | 11/2013 |
| JP | 2014-81522 A | 5/2014 |
| JP | 2014-196274 A | 10/2014 |
| JP | 2015-4919 A | 1/2015 |
| JP | 2015-94878 A | 5/2015 |
| WO | WO 2014/061236 A1 | 4/2014 |
| WO | WO 2014/061237 A1 | 4/2014 |

OTHER PUBLICATIONS

International Preliminary Report on Patentability (Forms PCT/IPEA/409 and PCT/IPEA/416) for International Application No. PCT/JP2016/001015, dated Jun. 6, 2017, with an English translation issued on Jul. 31, 2017.

International Search Report and Written Opinion of the International Searching Authority (Forms PCT/ISA/210 and PCT/ISA/237) for International Application No. PCT/JP2016/001015, dated Jun. 28, 2016, with an English translation of the Search Report.

Written Opinion of the IPEA (Form PCT/IPEA/408) for International Application No. PCT/JP2016/001015, dated Feb. 7, 2017.

* cited by examiner a b c

ANTIREFLECTION FILM AND OPTICAL MEMBER

CROSS-REFERENCE TO RELATED APPLICATIONS

This application is a Continuation of PCT International Application No. PCT/JP2016/001015 filed on Feb. 25, 2016, which claims priority under 35 U.S.C. § 119(a) to Japanese Patent Application No. 2015-038974 filed on Feb. 27, 2015. Each of the above applications is hereby expressly incorporated by reference, in its entirety, into the present application.

BACKGROUND OF THE INVENTION

1. Field of the Invention

The present invention relates to an antireflection film including an uneven structure layer and an optical member.

2. Description of the Related Art

In the past, in a lens (transparent substrate) using a translucent member such as glass or plastic, an antireflection film has been provided on a light incident surface in order to reduce the loss of transmitted light by surface reflection.

For example, as an antireflection film for visible light, a dielectric material multilayer film, a fine uneven layer having a pitch shorter than a wavelength of visible light, and the like have been known (JP2005-275372A, JP2013-47780A, and JP2015-4919A and the like).

Generally, the refractive index of a material forming a fine uneven layer is different from the refractive index of a transparent substrate. Accordingly, in the case in which the material is used for antireflection of the transparent substrate, it is necessary to adjust a difference in refractive index between the uneven layer and the transparent substrate.

JP2005-275372A discloses a constitution in which a fine uneven layer, which is obtained by boehmitization of alumina, is formed on a substrate with a thin transparent film layer (intermediate layer) interposed therebetween.

In addition, JP2013-47780A discloses a constitution in which as intermediate layers between a substrate and a fine uneven layer obtained by boehmitization of alumina, two adjustment layers having an intermediate refractive index between the refractive index of the uneven layer and the refractive index of the substrate, specifically, first and second adjustment layers having a relationship of the refractive index of the substrate>the refractive index of the first adjustment layer>the refractive index of the second adjustment layer>the refractive index of the uneven layer, are arranged from the substrate side in the order of first adjustment layer and second adjustment layer.

Further, JP2015-4919A discloses a constitution having an intermediate layer of a five-layer structure, and a reflectance of 0.4% or less is obtained at an incident angle of 0 degrees in a wavelength region of 400 nm to 850 nm.

SUMMARY OF THE INVENTION

The present inventors have found that during more intensive investigations on an antireflection structure including an uneven structure layer, when an antireflection structure includes an uneven structure layer made of an alumina hydrate obtained by boehmitization of an alumina ($Al_2O_3$) film, there is a problem in that slight scattering light at an unignorable level is generated and this light is recognized as a cloud on the antireflection film forming surface in a product such as a lens so that the quality of an optical element is significantly affected by the light in some cases. It has been found that the uneven structure obtained by boehmitization of an aluminum (Al) film instead of an alumina film can further suppress scattered light compared to an uneven structure prepared using an alumina film, and an antireflection film including an uneven structure layer that can suppress scattered light has been proposed (JP2014-196274: unpublished at the time of application). In addition, it has been found that it is preferable that the spatial frequency peak value of the uneven structure is 6.0 m$^{-1}$ or greater to suppress scattered light.

On the other hand, as a result of further intensive investigations, it has been found that while an uneven structure layer obtained by boehmitization of an alumina film in conventional cases attains antireflection properties achieving a reflectance of 0.4% or less in a wide range of a bandwidth of 450 nm or more, in the case of the antireflection film including an uneven structure layer obtained by boehmitization of an aluminum (Al) film, a bandwidth satisfying a reflectance of 0.4% or less is narrow. Hereinafter, detailed descriptions will be made using specific examples.

First, as the antireflection film including an uneven structure layer obtained by boehmitization of an alumina film in the related art, a layer of silicon oxynitride (SiON) having a refractive index of 1.547 was laminated on a flat glass made of S-LAH55V (manufactured by Ohara Inc.) to have a film thickness of 85 nm, then the alumina was formed into a film having a film thickness of 65 nm, and the film was immersed in hot water at 100° C. for 3 minutes to prepare an antireflection film. In this case, the amount of scattered light was 16.6 and the spatial frequency peak value of the uneven structure was 5.8 μm$^{-1}$ when examined. The result of the measurement of the wavelength dependence of the reflectance of the antireflection film is shown in FIG. 16.

On the other hand, as the antireflection film including an uneven structure layer obtained by boehmitization of an aluminum film, a layer of SiON having a refractive index of 1.537 was laminated on a flat glass made of S-LAH55V (manufactured by Ohara Inc.) to have a film thickness of 110 nm, then the aluminum was formed into a film having a 50 nm, and the film was immersed in hot water at 100° C. for 3 minutes to prepare an antireflection film. In this case, the amount of scattered light was 7.3 and the spatial frequency peak value of the uneven structure was 6.5 μm$^{-1}$. The result of the measurement of the wavelength dependence of the reflectance of the antireflection film is shown in FIG. 17.

Here, the spatial frequency peak value was obtained as follows. A microscopic image (magnification of 30,000 times, accelerating voltage of 7.0 kV) photographed with a scanning electron microscope S-4100 (manufactured by Hitachi. Ltd.) was cut into a 600×400 pixel image and two-dimensional Fourier transformation was carried out using image processing software Igor. The square intensity spectrum of the obtained two-dimensional spatial frequency was integrated in an azimuth direction and the intensity of the spectrum corresponding to the magnitude of the spatial frequency was obtained to calculate a relationship between the one-dimensional spatial frequency and the spectrum intensity. Then, using image processing software Igor, the vicinity of the apex was fitted with the Lorenz function to obtain the spatial frequency value having the maximum intensity as the spatial frequency peak value.

In addition, in the measurement of the amount of scattered light, as shown in the method of measuring the intensity of scattered light in FIG. 18, light emitted from a halogen light source 11 (LA-150FBU: manufactured by Hayashi Watch Co., Ltd.) was guided by an optical fiber 12 having a core diameter of 600 μm, then collimated by a lens 13 (focal length f=50 mm), and converged by a lens 14 (focal length f=200 mm) at an incident angle of 45° with respect to the surface of the uneven structure layer of the optical member indicated by a sample S. The sample surface was photographed by a complementary metal oxide semiconductor (CMOS) camera 15 (ARTCAM-900MI: manufactured by ARTRAY. CO., LTD.) equipped with a camera lens having a focal length f=8 mm and an F value of 1.4 while setting the global gain to 64 and the shutter speed value to 2,400. The average value of the pixel values of a 128×128 pixel light converged region obtained by subtracting the background value was set to a value of the amount of scattered light.

The wavelength dependence of the reflectance was measured by the method in Examples which will be described later.

Although the uneven structure layer formed of an alumina film has a large amount of scattered light compared to the uneven structure layer formed of an aluminum film, as shown in FIG. 16, good antireflection performance in which a reflectance of 0.2% or less is obtained over a wide range of a wavelength of 400 nm to 800 nm and a reflectance of 0.4% or less is obtained over the entire measured wavelength range of 380 nm to 800 nm are exhibited. On the other hand, while the uneven structure layer formed of an aluminum film suppresses the amount of scattered light, as shown in FIG. 17, a reflectance of 0.4% or less is obtained only in a wavelength bandwidth of 230 nm of a wavelength of 430 nm to 660 nm. There is a demand for an antireflection film satisfying a reflectance of 0.4% or less over a bandwidth of 450 nm or more and having high durability in practical use in order to suppress the amount of scattered light and maintain a low reflectance at a wide incident angle.

The present invention is made in consideration of the above circumstances and an object thereof is to provide an antireflection film that suppresses scattered light, maintains good antireflection performance over a bandwidth of 450 nm or more, and has high durability, and an optical member including an antireflection film.

A first antireflection film of the present invention that is provided on a surface of a substrate, the film comprising:
an uneven structure layer that has an uneven structure in which a distance between protrusions is shorter than a wavelength of light of which reflection is to be suppressed, and that has an alumina hydrate as a main component; and an intermediate layer that is disposed between the uneven structure layer and the substrate.
in which the uneven structure layer has a spatial frequency peak value of the uneven structure of 6.5 μm$^{-1}$ or greater and has a film thickness of 250 nm or more,
the intermediate layer comprises a plurality of layers including at least a first layer, a second layer, a third layer, a fourth layer, a fifth layer, a sixth layer, a seventh layer, and an eighth layer in this order from the uneven structure layer side to the substrate side,
the first layer has a refractive index of 1.42 or more and less than 1.7 and a film thickness of 2 nm or more and 20 nm or less,
the second layer has a refractive index of 1.7 or more and 2.7 or less and a film thickness of 2 nm or more and 30 nm or less,
the third layer has a refractive index of 1.42 or more and less than 1.7 and a film thickness of 10 nm or more and 200 nm or less,
the fourth layer has a refractive index of 1.7 or more and 2.7 or less and a film thickness of 2 nm or more and 30 nm or less,
the fifth layer has a refractive index of 1.42 or more and less than 1.7 and a film thickness of 10 nm or more and 200 nm or less,
the sixth layer has a refractive index of 1.7 or more and 2.7 or less and a film thickness of 2 nm or more and 30 nm or less,
the seventh layer has a refractive index of 1.42 or more and less than 1.7 and a film thickness of 10 nm or more and 200 nm or less, and
the eighth layer has a refractive index of 1.7 or more and 2.7 or less and a film thickness of 2 nm or more and 30 nm or less.

Here, the spatial frequency peak value of the uneven structure refers to a value of a spatial frequency exhibiting the maximum intensity in the case of obtaining the spatial frequency intensity distribution (spectrum) of the uneven structure. The method of obtaining the spatial frequency intensity distribution is as described above.

A second antireflection film of the present invention that is provided on a surface of a substrate, the film comprising:
an uneven structure layer that has an uneven structure in which a distance between protrusions is shorter than a wavelength of light of which reflection is to be suppressed, and that has an alumina hydrate as a main component; and an intermediate layer that is disposed between the uneven structure layer and the substrate,
in which the uneven structure layer is obtained by treating an aluminum film with hot water and has a film thickness of 250 nm or more,
the intermediate layer comprises a plurality of layers including at least a first layer, a second layer, a third layer, a fourth layer, a fifth layer, a sixth layer, a seventh layer, and an eighth layer in this order from the uneven structure layer side to the substrate side,
the first layer has a refractive index of 1.42 or more and less than 1.7 and a film thickness of 2 nm or more and 20 nm or less,
the second has a refractive index of 1.7 or more and 2.7 or less and a film thickness of 2 nm or more and 30 nm or less,
the third layer has a refractive index of 1.42 or more and less than 1.7 and a film thickness of 10 nm or more and 200 nm or less,
the fourth has a refractive index of 1.7 or more and 2.7 or less and a film thickness of 2 nm or more and 30 nm or less,
the fifth layer has a refractive index of 1.42 or more and less than 1.7 and a film thickness of 10 nm or more and 200 nm or less,
the sixth layer has a refractive index of 1.7 or more and 2.7 or less and a film thickness of 2 nm or more and 30 nm or less,
the seventh layer has a refractive index of 1.42 or more and less than 1.7 and a film thickness of 10 nm or more and 200 nm or less, and
the eighth layer has a refractive index of 1.7 or more and 2.7 or less and a film thickness of 2 nm or more and 30 nm or less.

The term "main component" used in the specification refers to a component whose content is 90% or higher among all components. In addition, the refractive index is defined as a value with respect to the light having a wavelength of 540 nm.

In the antireflection film of the present invention, the intermediate layer may further include a ninth layer on the substrate side of the eighth layer, and in this case, it is preferable that the ninth layer has a refractive index of 1.42 or more and less than 1.7 and a film thickness of 10 nm or more and 200 nm or less.

In the antireflection film of the present invention, the intermediate layer may further include a tenth layer on the substrate side of the ninth layer, and in this case, it is preferable that the tenth layer has a refractive index of 1.7 or more and 2.7 or less and a film thickness of 2 nm or more and 30 nm or less.

It is preferable that the first layer is made of silicon oxide or silicon oxynitride.

It is preferable that the second layer is made of niobium oxide.

It is preferable that odd-numbered layers among the plurality of layers constituting the intermediate layer are formed of the same material. The odd-numbered layers refer to layers laminated in odd numbers, such as the first layer, the third layer, and the fifth layer, from the uneven structure layer side.

It is preferable that even-numbered layers among the plurality of layers constituting the intermediate layer are formed of the same material. The even-numbered layers refer to layers laminated in even numbers, such as the second layer, the fourth layer, and the sixth layer, from the uneven structure layer side.

An optical member of the present invention comprises the antireflection film; and a transparent substrate having a surface on which the antireflection film is formed.

It is preferable that a refractive index of the transparent substrate is 1.73 or more.

Since the first antireflection film of the present invention includes an uneven structure layer that has an uneven structure in which a distance between protrusions is shorter than a wavelength of light of which reflection is to be suppressed and has an alumina hydrate as a main component, and an intermediate layer that is disposed between the uneven structure layer and the substrate, and the uneven structure layer has a spatial frequency peak value of the uneven structure of 6.5 µm$^{-1}$ or greater and has a film thickness of 250 nm or more, the intensity of scattered light can be suppressed compared to the related art and high durability is obtained. In addition, since the intermediate layer is constituted of a plurality of layers including at least a first layer, a second layer, a third layer, a fourth layer, a fifth layer, a sixth layer, a seventh layer, and an eighth layer in this order from the uneven structure layer side to the substrate side, and each layer has the above-described predetermined refractive index and film thickness, in the case of combining the intermediate layer with the above-described uneven structure layer, good antireflection performance can be obtained over a wide bandwidth range.

Since the second antireflection film of the invention includes an uneven structure layer that has an uneven structure in which a distance between protrusions is shorter than a wavelength of light of which reflection is to be suppressed and has an alumina hydrate as a main component, and an intermediate layer that is disposed between the uneven structure layer and the substrate, and the uneven structure layer is obtained by treating the aluminum film with hot water and has a film thickness of 250 nm or more, the intensity of scattered light can be suppressed compared to the related art and high durability is obtained. In addition, since the intermediate layer is constituted of a plurality of layers including at least a first layer, a second layer, a third layer, a fourth layer, a fifth layer, a sixth layer, a seventh layer, and an eighth layer in this order from the uneven structure layer side to the substrate side, and each layer has the above-described predetermined refractive index and film thickness, in the case of combining the intermediate layer with the above-described uneven structure layer, good antireflection performance can be obtained over a wide bandwidth.

DESCRIPTION OF THE PREFERRED EMBODIMENTS

Hereinafter, embodiments of the present invention will be described.

Figure 1A:
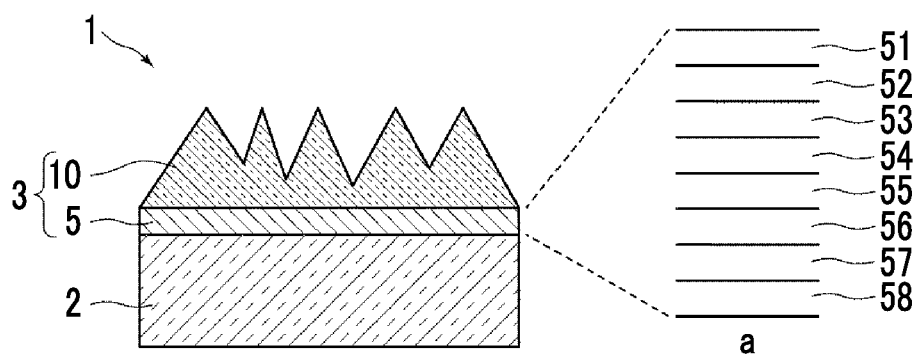
FIG. 1A is a schematic cross-sectional view showing a schematic constitution of an optical member according to an embodiment of the present invention.
Figure 1A:
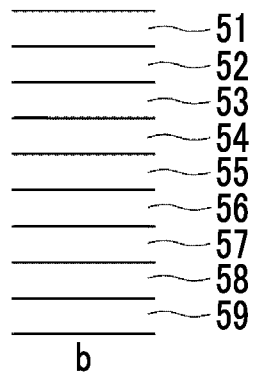
Figure 1A:
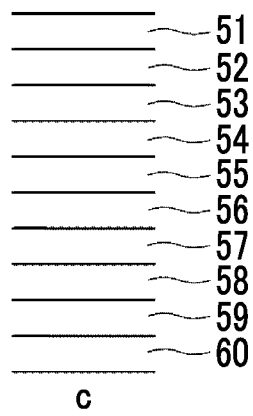

FIG. 1A is a schematic cross-sectional view showing a schematic configuration of an optical member 1 including an antireflection film according to an embodiment of the present invention. As shown in FIG. 1A, the optical member 1 of the embodiment includes a transparent substrate 2, and an antireflection film 3 that is formed on the surface of the transparent substrate 2. The antireflection film 3 includes an uneven structure layer 10 that has an uneven structure in which a distance between protrusions is shorter than a wavelength of light of which reflection is to be suppressed and has an alumina hydrate as a main component, and an intermediate layer 5 that is disposed between the uneven structure layer 10 and the transparent substrate 2. The light of which reflection is to be suppressed varies depending on the purpose but is generally light in a visible light region. If necessary, light in an infrared region may be used. In the embodiment, light in a visible light region (400 nm to 750 nm) is mainly used.

The shape of the transparent substrate 2 is not particularly limited and the transparent substrate is an optical element that can be used mainly in an optical device such as a flat plate, a concave lens, or a convex lens and also may be a substrate constituted by a combination of a curved surface having a positive or negative curvature and a flat surface. For the material for the transparent substrate 2, glass, plastic, and the like can be used. Here, the term "transparent" means being transparent (having an internal transmittance of about 10% or more) to a wavelength of light of which reflection is to be suppressed (reflection prevention target light) in the optical member.

The refractive index nS of the transparent substrate 2 is preferably 1.73 or more. As the material satisfying the above condition, specifically, FDS90 (manufactured by HOYA Corporation), S-LAL18, YGH51. S-LAL61, S-LAL59, S-LAH51, S-LAH55V, and L-BBH1 (all manufactured by Ohara Inc.), and MR174 (manufactured by Mitsui Chemicals, Inc.) may be exemplified.

The uneven structure layer 10 has a spatial frequency peak value of greater than 6.5 $\mu m^{-1}$ of the uneven structure and has a film thickness of 250 nm or more. The alumina hydrate constituting the uneven structure layer 10 is boehmite (denoted as $Al_2O_3 \cdot H_2O$ or AlOOH) which is an alumina monohydrate, bayerite (denoted as $Al_2O_3 \cdot 3H_2O$ or $Al(OH)_3$) which is an alumina trihydrate (aluminum hydroxide), or the like.

The uneven structure layer 10 is transparent and has various sizes of protrusions (sizes of apex angles) and directions thereof but has a substantially saw-teeth-shaped cross section. The distance between the protrusions of the uneven structure layer 10 is a distance between the apexes of the most adjacent protrusions with a recess interposed therebetween. The average distance is equal to or more than the wavelength of the light of which reflection is to be suppressed and is in an order of several tens of nanometers to several hundreds of nanometers. The distance is preferably 150 nm or less and more preferably 100 nm or less. The uneven structure layer 10 has the largest void and is loosened on the surface side in contact with an air layer, and has a region in which the refractive index is gradually increased from 1.0 in a thickness direction from the surface side in contact with the air layer to the substrate side.

The average distance between the protrusions is obtained by photographing a surface image of the uneven structure with a scanning electron microscope (SEM), subjecting the image to image processing to binarize the image, and carrying out statistical processing.

The uneven structure of the uneven structure layer 10 has a random shape but the present inventors have found that when there is a fluctuation in the long wavelength of about the wavelength of light, the fluctuation becomes a cause of generating scattered light. The degree of fluctuation in the long wavelength of the fine uneven structure can be estimated from the Fourier transform of the structure pattern. The spatial frequency intensity spectrum can be calculated by subjecting an electron microscope image obtained by observing the uneven structure pattern from the top surface to discrete Fourier transformation and the spatial frequency value having the intensity peak thereof (spatial frequency peak value) gives the standard of the structure size. In the aforementioned JP2014-196274, the inventors have found that as the spatial frequency peak value becomes closer to a high frequency side, the intensity of scattered light becomes smaller. It has been found that when the spatial frequency of the uneven structure is more than 6.5 $\mu m^{-1}$, the generation of scattered light can be effectively suppressed.

It is known that the uneven structure layer made of an alumina hydrate is generally obtained by forming a compound including aluminum, particularly, alumina, into a thin film, and treating the film with hot water. It is considered that the spatial frequency peak of the uneven structure depends on a process of self-organizing boehmite which is an alumina hydrate, but according to the investigations of the present inventors, even when the conditions for the hot water treatment including the time of the hot water treatment, the temperature of the water used in the hot water treatment, the pH of the water used in the hot water treatment, and the like are changed, the spatial frequency peak is not significantly changed. On the other hand, it has been found that the spatial frequency peak value can be significantly shifted to a high frequency side compared to the related art by using aluminum as the material for the precursor of the uneven structure layer instead of alumina in the related art.

The uneven structure layer 10 having a spatial frequency peak value of 6.5 $\mu m^{-1}$ can be obtained by forming an aluminum film as the precursor thereof and carrying out a hot water treatment by immersing the aluminum film in hot water at 70° C. or higher for 1 minute or longer. Particularly, it is preferable that after an aluminum film is formed by vapor phase film formation of vacuum deposition, plasma sputtering, electron cyclotron sputtering, ion plating, or the like, the film is treated with hot water. Although the conductivity of the liquid of the hot water treatment varies due to causes such as contamination of a hot water treatment tank, absorption of gas in the air, and addition of additives, as the raw material for the treatment liquid used in the hot water treatment, ultra pure water having an electric resistivity of 12 MΩ·cm or more at a water temperature of 25° C. is preferably used.

In addition, the film thickness of the uneven structure layer 10 is defined as a thickness from the position of the interface with the intermediate layer to the protrusion distal end.

Figure 1B:
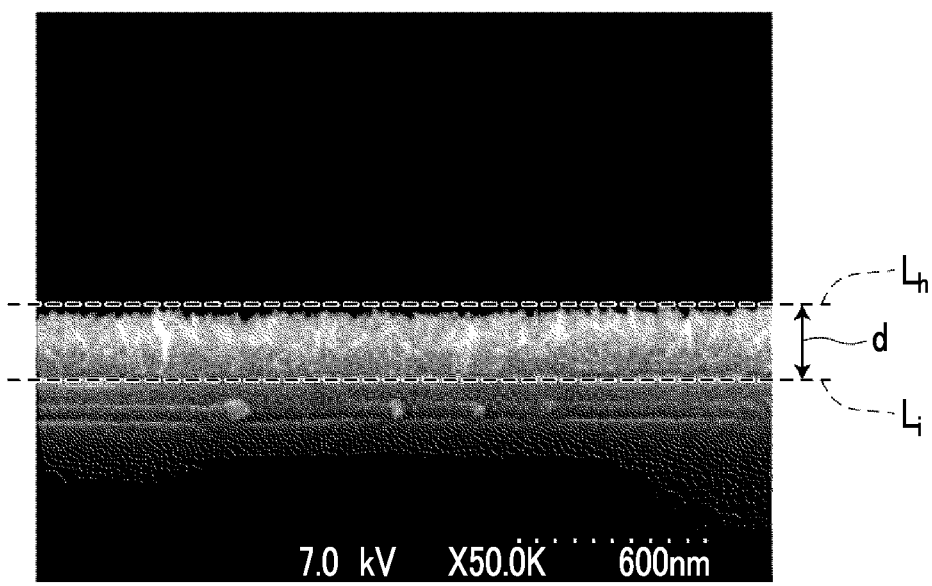
FIG. 1B is a view for explaining a method of measuring the film thickness of an uneven structure layer.

The specific method of measuring the film thickness of the uneven structure layer will be described with reference to FIG. 1B. FIG. 1B is an electron microscope image obtained by photographing the cross section of the antireflection film of Comparative Example 1 which will be described later with a scanning electron microscope S-4100 (Hitachi) at a magnification of 50,000 times.

Since the intermediate layer does not have a structure in the in-plane direction along the laminated surface (the left and right direction in the image of FIG. 1B) and the uneven structure layer has a structure in the in-plane direction, the interface between a region having a structure and a region not having a structure in the in-plane direction in the in-plane direction in the electron microscope image of the cross section of the sample is defined as the interface between the intermediate layer and the uneven structure layer. Next, among the lines parallel with a linear line $L_i$ denoting the interface between the intermediate layer and the uneven structure layer, a linear line passing through the region in which the uneven structure layer is present and having the longest distance from the linear line $L_i$ is defined as a linear line $L_h$ passing through the protrusion distal end of the uneven structure layer. At this time, a distance d between the two parallel linear lines $L_i$ and $L_h$ is defined as the film thickness of the uneven structure layer. It is required that the electron microscope image used for measuring the film thickness of the uneven structure layer is photographed over a region of at least 1 μm or more in the in-plane direction as a photographing range.

The present inventors have found that an antireflection film having high durability can be formed by setting the film thickness to 250 nm or more (refer to Examples which will be described later). The film thickness is more preferably 280 nm or more and still more preferably 300 nm or more.

As the uneven structure layer made of an alumina hydrate of the related art separates from the substrate in the thickness direction, the refractive index gradually decreases and thus the uneven structure layer has a profile of a refractive index close to 1. However, the uneven structure layer obtained by treating the aluminum used in the present invention with hot water has an uneven structure having a spatial frequency peak value of greater than 6.5 μm$^{-1}$, and the maximum refractive index is exhibited in a region from the center of the uneven structure layer in the film thickness direction to the intermediate layer (refer to Example 1 which will be described later).

More specifically, the uneven structure layer exhibits a profile in which a refractive index of the uneven structure layer of the embodiment in the film thickness direction gradually increases from the surface (air layer) side, the maximum peak is exhibited in a region from the center of the uneven structure layer in the film thickness direction to the interface with the intermediate layer, and the refractive index gradually decreases toward the interface to a refractive index that is at least 10% smaller than the maximum peak.

As shown in a of FIG. 1A, the intermediate layer 5 is constituted of a plurality of layers including at least a first layer 51, a second layer 52, a third layer 53, a fourth layer 54, a fifth layer 55, a sixth layer 56, a seventh layer 57 and an eighth layer 58 in this order from the uneven structure layer 10 side to the substrate 2 side. At this time, the first layer 51 has a refractive index of 1.42 or more and less than 1.7 and a film thickness of 2 nm or more and 20 nm or less, the second layer 52 has a refractive index of 1.7 or more and 2.7 or less and a film thickness of 2 nm or more and 30 nm or less, the third layer 53 has a refractive index of 1.42 or more and less than 1.7 and a film thickness of 10 nm or more and 200 nm or less, the fourth layer 54 has a refractive index of 1.7 or more and 2.7 or less and a film thickness of 2 nm or more and 30 nm or less, the fifth layer 55 has a refractive index of 1.42 or more and less than 1.7 and a film thickness of 10 nm or more and 200 nm or less, the sixth layer 56 has a refractive index of 1.7 or more and 2.7 or less and a film thickness of 2 nm or more and 30 nm or less, the seventh layer 57 has a refractive index of 1.42 or more and less than 1.7 and a film thickness of 10 nm or more and 200 nm or less, and the eighth layer 58 has a refractive index of 1.7 or more and 2.7 or less and a film thickness of 2 nm or more and 30 nm or less.

The intermediate layer 5 has an eight-layer structure including at least the first layer 51 to the eighth layer 58 as described above. The intermediate layer may include a ninth layer 59 as shown in b in FIG. 1A or may further include a ninth layer 59 and a tenth layer 60 as shown in c in FIG. 1A. Here, the ninth layer 59 has a refractive index of 1.42 or more and less than 1.7 and a film thickness of 10 nm or more and 200 nm or less, and the tenth layer 60 has a refractive index of 1.7 or more and 2.7 or less and a film thickness of 2 nm or more and 30 nm or less.

The intermediate layer 5 may include 11 layers or more and in this case, it is sufficient to alternately arrange a layer having a refractive index of 1.42 or more and less than 1.7 (hereinafter, sometimes referred to as a "low refractive index layer") and a layer having a refractive index of 1.7 or more and 2.7 or less (hereinafter, sometimes referred to as a "high refractive index layer") for the eleventh layer and the subsequent layers.

The odd-numbered layers having a refractive index of 1.42 or more and less than 1.7 may not have the same refractive index, but it is preferable that the layers have the same material and the same refractive index from the viewpoint of suppressing material costs, film formation costs, and the like. Similarly, the even-numbered layers having a refractive index of 1.7 or more and 2.7 or less may not the same refractive index, but it is preferable that the layers have the same material and the same refractive index from the viewpoint of suppressing material costs, film formation costs, and the like.

Examples of materials having a low refractive index include silicon oxide, silicon oxynitride, gallium oxide, aluminum oxide, lanthanum oxide, lanthanum fluoride, and magnesium fluoride.

Examples of materials having a high refractive index include niobium oxide ($Nb_2O_5$, n=2.361), titanium oxide ($TiO_2$, n=2.659), zirconium oxide ($ZrO_2$, n=2.167), tantalum oxide ($Ta_2O_5$, n=2.161), silicon oxynitride (SiON, n=1.7 to 1.986), silicon nitride (SiN, n=1.986), and silicon niobium oxide (NbSiO, n=1.7 to 2.361).

The first layer 51 is preferably made of silicon oxide (particularly, silicon dioxide $SiO_2$) or silicon oxynitride (SiON). SiON can satisfy a refractive index of 1.42 or more and less than 1.7 by appropriately setting the composition ratio of the elements. In addition, silicon niobium oxide (NbSiO) may be used. NbSiO can satisfy a refractive index n of 1.42 to less than 1.7 by appropriately setting the composition ratio of the elements.

In addition, the second layer 52 is preferably made of niobium oxide (particularly, niobium pentaoxide $Nb_2O_5$).

In the film formation of each layer of the intermediate layer 5, a vapor phase film forming method such as vacuum deposition, plasma sputtering, electron cyclotron sputtering, or ion plating is preferably used. According to the vapor phase film formation, laminated structures having various refractive indices and layer thicknesses can be easily formed.

In the above embodiment, the optical member 1 in which the antireflection film 3 was formed on the surface of the transparent substrate 2 is described, but the antireflection film of the present invention can be formed on any member having a surface in which light reflection is to be prevented to be used. For example, it is also considered that absorption performance is improved by providing the antireflection film on the surface of an absorbent that absorbs more than 90% of incident light to prevent light reflection.

EXAMPLES

Hereinafter, while describing Examples and Comparative Examples of the present invention, the constitutions and effects of the present invention will be described in detail.

Example 1

Four layers of each of silicon oxynitride layer as a low refractive index layer and a niobium oxide layer as a high refractive index layer of the intermediate layer were alternately laminated on a substrate made of FDS90 (manufactured by HOYA Corporation) and a thin aluminum film having a film thickness of 50 nm was formed on the silicon oxynitride layer of the first layer. That is, the intermediate layer included first to eighth layers.

Then, a hot water treatment was carried out by immersing the film in hot water heated to 100° C. for 3 minutes to prepare an uneven structure layer having a transparent uneven structure having an alumina hydrate as a main component. Thus, an optical member including an antireflection film of Example 1 was obtained. The layer constitution from the substrate to the uneven structure layer of Example 1 is as shown in Table 1 below. In Table 1, the refractive index and the film thickness of each layer of the intermediate layer are designed values and sputtering conditions and sputtering time for obtaining the refractive index and the film thickness shown in the table are set from a relationship of the sputtering conditions such as a target composition and a gas flow rate at the time of sputtering and the refractive index and a relationship of the thickness of the formed film and the sputtering time obtained in advance to form a film. The same is applied to the following examples and comparative examples. The film thicknesses are all physical film thicknesses.

The film thickness of the uneven structure layer was obtained according to the aforementioned method from the electron microscope image photographed with a scanning electron microscope S-4100 (Hitachi) at a magnification of 50,000 times.

The film thickness of the uneven structure layer in Example 1 was 310 nm. In the following Examples and Comparative Examples, any of uneven structure layers obtained by treating the thin aluminum film having a film thickness of 50 nm with hot water as in Example 1 had the same film thickness.

Here, the silicon oxynitride and niobium oxide were formed into films by reactive sputtering and the aluminum film was formed by radio frequency (RF) sputtering. As the liquid used in the hot water treatment, pure water having an electric resistivity of 12 MΩ·cm was used. The electric resistivity of the liquid used in the hot water treatment was measured at a water temperature of 25° C. using an electric resistivity meter HE-200R (HORIBA).

TABLE 1

| EXAMPLE 1 | | | | |
|---|---|---|---|---|
| Layer constitution | | Material | Refractive index | Physical film thickness (nm) |
| Uneven structure layer | | $Al_2O_3(H_2O)$ | 1 to 1.772 | 310 |
| Intermediate layer | First layer | SiON | 1.511 | 10 |
| | Second layer | $Nb_2O_5$ | 2.361 | 6 |
| | Third layer | SiON | 1.511 | 95 |
| | Fourth layer | $Nb_2O_5$ | 2.361 | 9 |
| | Fifth layer | SiON | 1.511 | 58 |
| | Sixth layer | $Nb_2O_5$ | 2.361 | 15 |
| | Seventh layer | SiON | 1.511 | 34 |
| | Eighth layer | $Nb_2O_5$ | 2.361 | 6 |
| Substrate | | FDS90 | 1.857 | |

Figure 2A:
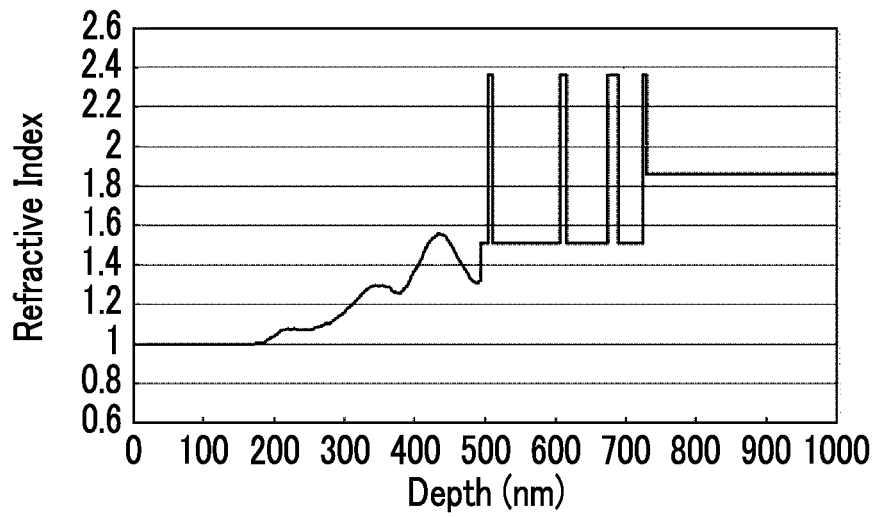
FIG. 2A is a view showing the refractive index distribution of an optical member of Example 1.

The refractive index distribution of the antireflection film of Example 1 in the thickness direction is shown in FIG. 2A. In FIG. 2A, the portion of a refractive index of 1 is air, a range of 180 nm to 490 nm on the horizontal axis is the position of the uneven structure layer, 180 nm on the horizontal axis is the position of the surface of the uneven structure layer, and 490 nm is the position of the surface of the uneven structure layer on the substrate side (interface with the intermediate layer). As shown in FIG. 2A, a profile in which the refractive index gradually increases from the surface side to the substrate side, the maximum peak is exhibited in a region from the center in the layer thickness direction to the interface with the intermediate layer and the refractive index decreases towards the interface is exhibited. In FIG. 2A, the intermediate layer is from 490 nm up to near 730 nm at which the refractive index is fixed to 1.857 and the region of a refractive index of 1.857 is the substrate.

In FIG. 2A, the refractive index distribution of the uneven structure layer in the thickness direction is a refractive index distribution obtained by subjecting a sample formed by forming a thin aluminum film having a thickness of 50 nm on the silicon substrate and treating the film with hot water under the same conditions ellipsometry and reflectance measurement.

Figure 2B:
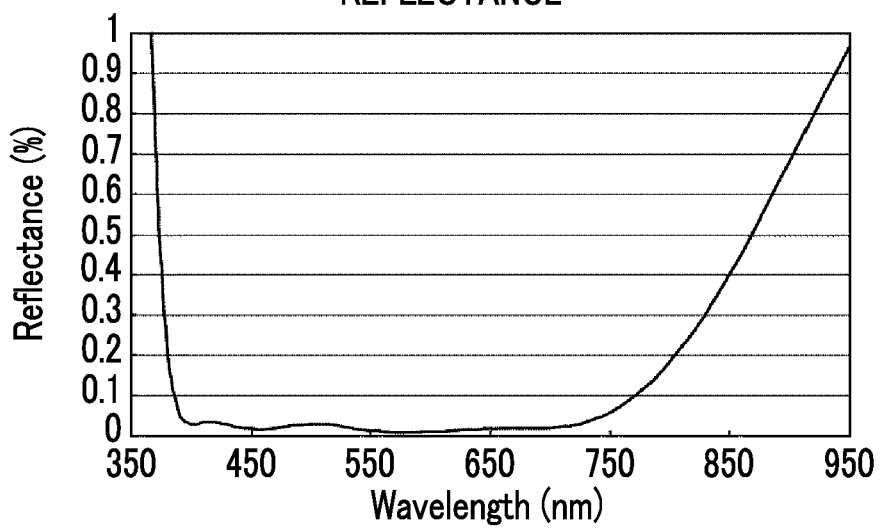
FIG. 2B is a view showing the wavelength dependence of the reflectance of the optical member of Example 1.

The wavelength dependence of the reflectance of the antireflection film in the optical member including the antireflection film of the example (hereinafter, referred to as "the wavelength dependence of the reflectance of the optical member") was measured with a spectroscopy. The reflectance was measured under the condition of an incident angle of 0°. The measurement result is shown in FIG. 2B. As shown in FIG. 2B, the antireflection film of the example exhibited a reflectance of 0.4% or less over a band of 470 nm of a wavelength of 380 nm to 850 nm and good antireflection properties were obtained.

Example 2

An optical member including an antireflection film of Example 2 was prepared in the same procedures as in the production method of Example 1 except that a substrate made of S-LAL18 (manufactured by Ohara Inc.) was used. The intermediate layer had an eight-layer structure of first to eighth layers as in Example 1 and the odd-numbered layers of first, third, fifth and seventh layers were made of silicon oxynitride and the even-numbered layers of second, fourth, sixth and eighth layers were made of niobium oxide. The film thickness of each layer was different from the film thickness of each layer in Example 1. The layer constitution of Example 2 from the substrate to the uneven structure layer is as shown in Table 2 below.

TABLE 2

EXAMPLE 2

| Layer constitution | | Material | Refractive index | Physical film thickness (nm) |
|---|---|---|---|---|
| Uneven structure layer | | $Al_2O_3(H_2O)$ | 1 to 1.7728 | 310 |
| Intermediate layer | First layer | SiON | 1.511 | 10 |
| | Second layer | $Nb_2O_5$ | 2.361 | 6 |
| | Third layer | SiON | 1.511 | 100 |
| | Fourth layer | $Nb_2O_5$ | 2.361 | 6 |
| | Fifth layer | SiON | 1.511 | 73 |
| | Sixth layer | $Nb_2O_5$ | 2.361 | 10 |
| | Seventh layer | SiON | 1.511 | 46 |
| | Eighth layer | $Nb_2O_5$ | 2.361 | 6 |
| Substrate | | S-LAL18 | 1.733 | |

Figure 3A:
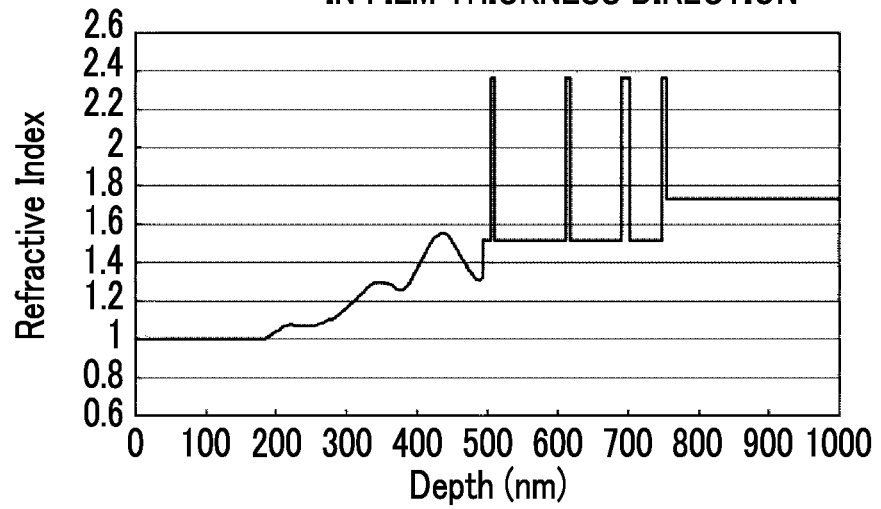
FIG. 3A is a view showing the refractive index distribution of an optical member of Example 2.
Figure 3B:
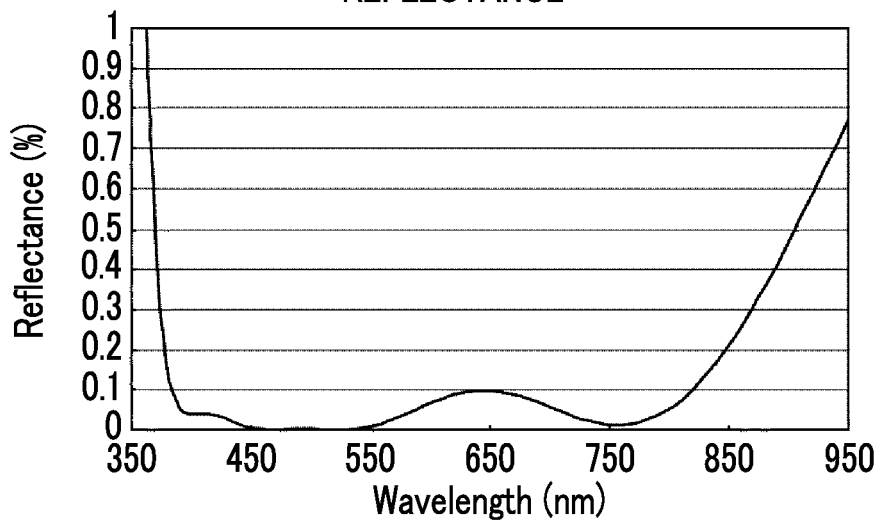
FIG. 3B is a view showing the wavelength dependence of the reflectance of the optical member of Example 2.

The refractive index distribution of the antireflection film of Example 2 in the thickness direction is shown in FIG. 3A, and the wavelength dependence of the reflectance is shown in FIG. 3B. Since the uneven structure layer of Example 2 is prepared in the same conditions as in Example 1, the region of the uneven structure layer in FIG. 3A exhibits the same refractive index distribution as in Example 1.

As shown in FIG. 3B, the antireflection film of Example 2 exhibited a reflectance of 0.4% or less over a band of 510 nm of a wavelength of 380 nm to 890 nm and good antireflection properties were obtained.

Example 3

An optical member including an antireflection film of Example 3 was prepared in the same procedures as in the production method of Example 1 except that the film thickness of the aluminum film was set to 40 nm. The intermediate layer had an eight-layer structure of first to eighth layers as in Example 1 and the odd-numbered layers of first, third, fifth and seventh layers were made of silicon oxynitride and the even-numbered layers of second, fourth, sixth and eighth layers were made of niobium oxide. The film thickness of each layer was different from the film thickness of each layer in Example 1. The layer constitution of Example 3 from the substrate to the uneven structure layer is as shown in Table 3 below. The film thickness of the uneven structure layer was measured in the same manner as in Example 1. The film thickness of the uneven structure layer in the example was 280 nm.

TABLE 3

EXAMPLE 3

| Layer constitution | | Material | Refractive index | Physical film thickness (nm) |
|---|---|---|---|---|
| Uneven structure layer | | $Al_2O_3(H_2O)$ | 1 to 1.772 | 280 |
| Intermediate layer | First layer | SiON | 1.511 | 10 |
| | Second layer | $Nb_2O_5$ | 2.361 | 6 |
| | Third layer | SiON | 1.511 | 93 |
| | Fourth layer | $Nb_2O_5$ | 2.361 | 13 |
| | Fifth layer | SiON | 1.511 | 56 |
| | Sixth layer | $Nb_2O_5$ | 2.361 | 22 |
| | Seventh layer | SiON | 1.511 | 37 |
| | Eighth layer | $Nb_2O_5$ | 2.361 | 11 |
| Substrate | | FDS90 | 1.857 | |

Figure 4A:
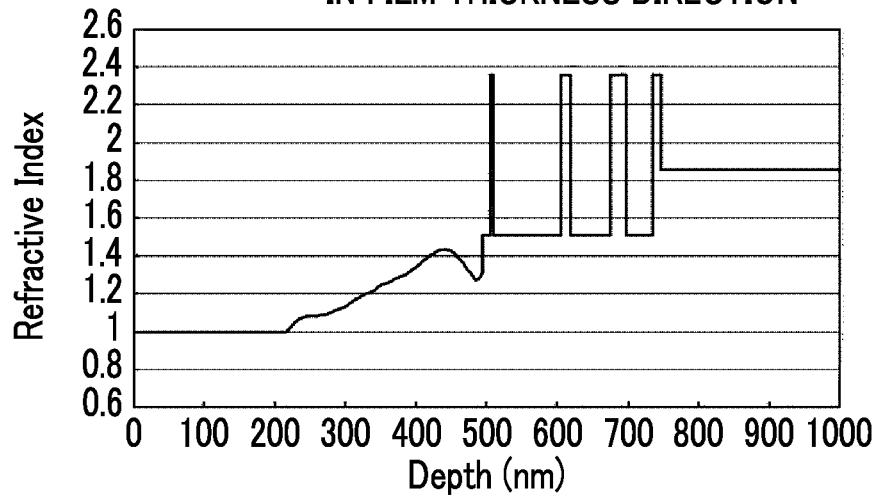
FIG. 4A is a view showing the refractive index distribution of an optical member of Example 3.
Figure 4B:
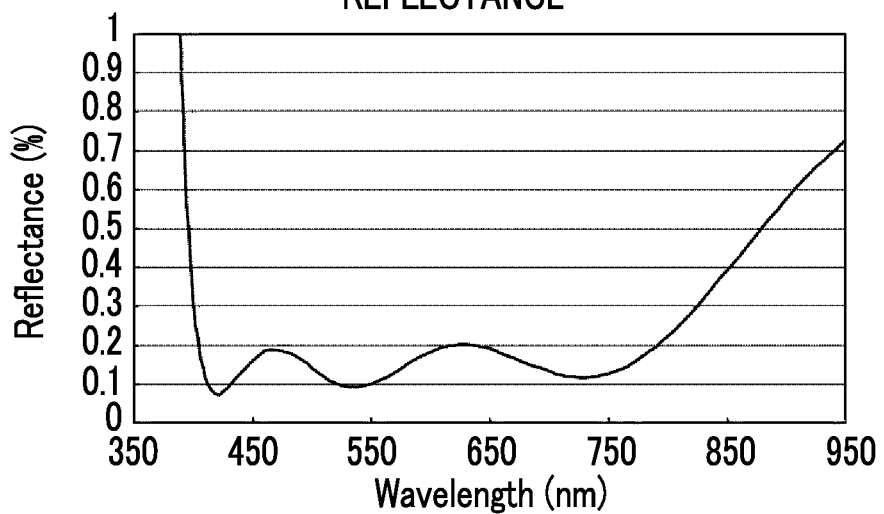
FIG. 4B is a view showing the wavelength dependence of the reflectance of the optical member of Example 3.

The refractive index distribution of the antireflection film of Example 3 in the thickness direction is shown in FIG. 4A, and the wavelength dependence of the reflectance is shown in FIG. 4B. The refractive index distribution of the uneven structure layer of Example 3 in the thickness direction is a refractive index distribution obtained by subjecting a sample formed by forming a thin aluminum film having a thickness of 40 nm on the silicon substrate and treating the film with hot water under the same conditions to ellipsometry and reflectance measurement.

Although the refractive index distribution of the uneven structure layer of Example 3 is not the same as in the case of Example 1 obtained by treating the thin aluminum film having a thickness of 50 nm with hot water, similarly, a profile in which the refractive index gradually increases from the surface side to the substrate side, the maximum peak is exhibited in a region from the center in the thickness direction to the interface with the intermediate layer, and the refractive index decreases toward the interface is exhibited.

As shown in FIG. 4B, the antireflection film of Example 3 exhibited a reflectance of 0.4% or less in a band of 450 nm of a wavelength of 400 nm to 850 nm and good antireflection properties were obtained.

Example 4

An optical member including an antireflection film of Example 4 was prepared in the same procedures as in the production method of Example 1 except that the odd-numbered layers of the intermediate layer were made of silicon oxide. That is, the intermediate layer had an eight-layer structure of first to eighth layers and the odd-numbered layers of first, third, fifth and seventh layers were made of silicon oxide and the even-numbered layers of second, fourth, sixth and eighth layers were made of niobium oxide. The layer constitution of Example 4 from the substrate to the uneven structure layer is as shown in Table 4 below.

TABLE 4

EXAMPLE 4

| Layer constitution | | Material | Refractive index | Physical film thickness (nm) |
|---|---|---|---|---|
| Uneven structure layer | | $Al_2O_3(H_2O)$ | 1 to 1.772 | 310 |
| Intermediate layer | First layer | $SiO_2$ | 1.460 | 10 |
| | Second layer | $Nb_2O_5$ | 2361 | 8 |
| | Third layer | $SiO_2$ | 1.460 | 80 |
| | Fourth layer | $Nb_2O_5$ | 2.361 | 11 |
| | Fifth layer | $SiO_2$ | 1.160 | 60 |

TABLE 4-continued

EXAMPLE 4

| Layer constitution | Material | Refractive index | Physical film thickness (nm) |
|---|---|---|---|
| Sixth layer | $Nb_2O_5$ | 2.361 | 16 |
| Seventh layer | $SiO_2$ | 1.460 | 35 |
| Eighth layer | $Nb_2O_5$ | 2.361 | 6 |
| Substrate | FDS90 | 1.857 | |

Figure 5A:
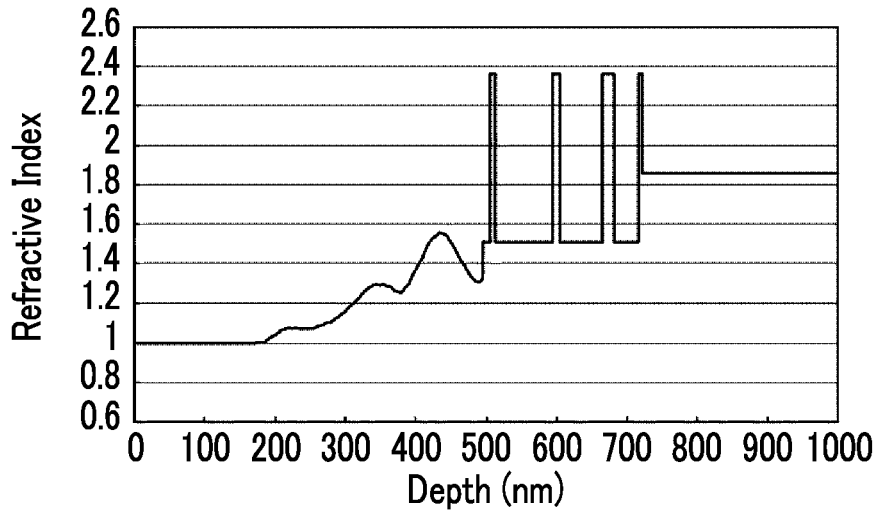
FIG. 5A is a view showing the refractive index distribution of an optical member of Example 4.
Figure 5B:
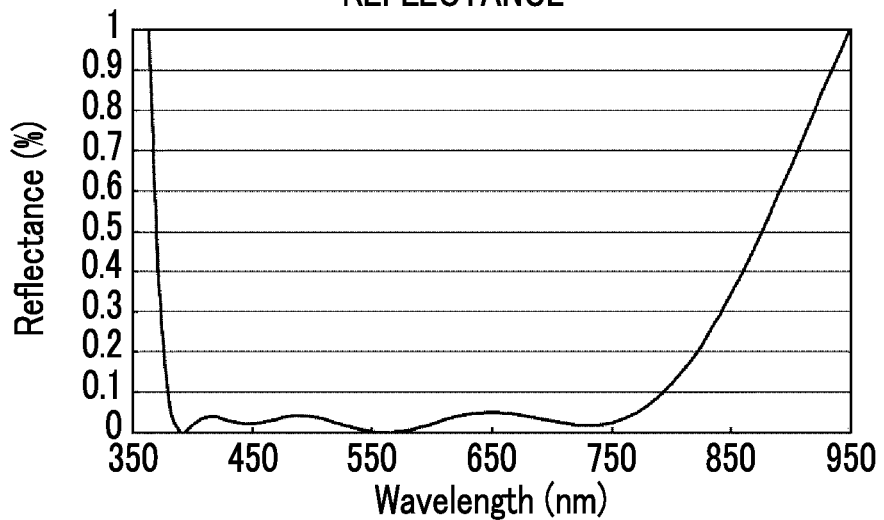
FIG. 5B is a view showing the wavelength dependence of the reflectance of the optical member of Example 4.

The refractive index distribution of the antireflection film of Example 4 in the thickness direction is shown in FIG. 5A, and the wavelength dependence of the reflectance is shown in FIG. 5B. Since the uneven structure layer of Example 4 is prepared under the same conditions as in Example 1, the region of the uneven structure layer in FIG. 5A exhibits the same refractive index distribution as in Example 1.

As shown in FIG. 5B, the antireflection film of Example 4 exhibited a reflectance of 0.4% or less over a band of 480 nm of a wavelength of 380 nm to 860 nm and good antireflection properties were obtained.

Example 5

An optical member including an antireflection film of Example 5 was prepared in the same procedures as in the production method of Example 1 except that the intermediate layer included a nine-layer structure. That is, the intermediate layer had a nine-layer structure of first to ninth layers, the odd-numbered layers of first, third, fifth, seventh and ninth layers were made of silicon oxynitride and the even-numbered layers of second, fourth, sixth and eighth layers were made of niobium oxide. The layer constitution of Example 5 from the substrate to the uneven structure layer is as shown in Table 5 below.

TABLE 5

EXAMPLE 5

| Layer constitution | | Material | Refractive index | Physical film thickness (nm) |
|---|---|---|---|---|
| Uneven structure layer | | $Al_2O_3(H_2O)$ | 1 to 1.772 | 310 |
| Intermediate layer | First layer | SiON | 1.511 | 10 |
| | Second layer | $Nb_2O_5$ | 2.361 | 6 |
| | Third layer | SiON | 1.511 | 100 |
| | Fourth layer | $Nb_2O_5$ | 2.361 | 6 |
| | Fifth layer | SiON | 1.511 | 68 |
| | Sixth layer | $Nb_2O_5$ | 2.361 | 11 |
| | Seventh layer | SiON | 1.511 | 45 |
| | Eighth layer | $Nb_2O_5$ | 2.361 | 12 |
| | Ninth layer | SiON | 1.511 | 19 |
| Substrate | | FDS90 | 1.857 | |

Figure 6A:
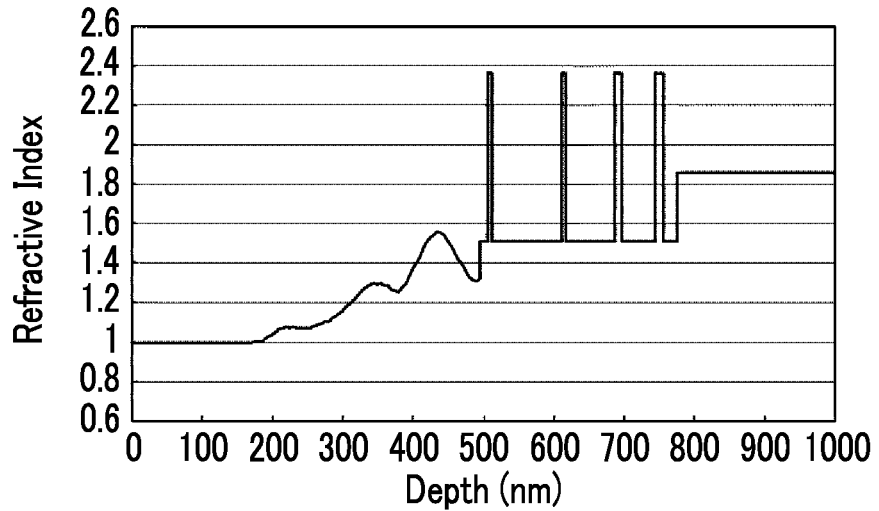
FIG. 6A is a view showing the refractive index distribution of an optical member of Example 5.
Figure 6B:
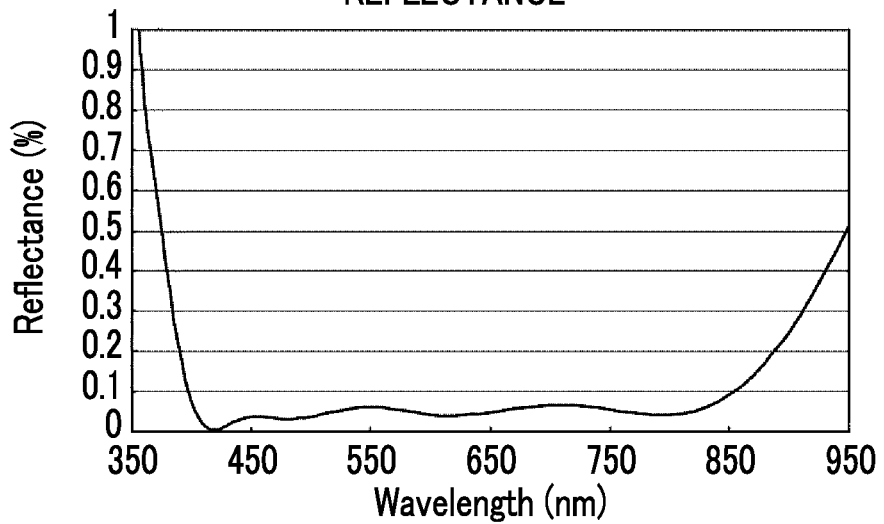
FIG. 6B is a view showing the wavelength dependence of the reflectance of the optical member of Example 5.

The refractive index distribution of the antireflection film of Example 5 in the thickness direction is shown in FIG. 6A, and the wavelength dependence of the reflectance is shown in FIG. 6B. Since the uneven structure layer of Example 5 is prepared under the same conditions as in Example 1, the region of the uneven structure layer in FIG. 6A exhibits the same refractive index distribution as in Example 1.

As shown in FIG. 6B, the antireflection film of Example 5 exhibited a reflectance of 0.4% or less over a band of 550 nm of a wavelength of 380 nm to 930 nm and good antireflection properties were obtained.

Example 6

An optical member including an antireflection film of Example 6 was prepared in the same procedures as in the production method of Example 1 except that the intermediate layer included a ninth layer and a tenth layer. That is, the intermediate layer had a ten-layer structure of first to tenth layers, the odd-numbered layers of first, third, fifth, seventh and ninth layers were made of silicon oxynitride and the even-numbered layers of second, fourth, sixth, eighth and tenth layers were made of niobium oxide. The layer constitution of Example 6 from the substrate to the uneven structure layer is as shown in Table 6 below.

TABLE 6

EXAMPLE 6

| Layer constitution | | Material | Refractive index | Physical film thickness (nm) |
|---|---|---|---|---|
| Uneven structure layer | | $Al_2O_3(H_2O)$ | 1 to 1.772 | 310 |
| Intermediate layer | First layer | SiON | 1.511 | 10 |
| | Second layer | $Nb_2O_5$ | 2.361 | 6 |
| | Third layer | SiON | 1.511 | 93 |
| | Fourth layer | $Nb_2O_5$ | 2.361 | 6 |
| | Fifth layer | SiON | 1.511 | 72 |
| | Sixth layer | $Nb_2O_5$ | 2.361 | 11 |
| | Seventh layer | SiON | 1.511 | 48 |
| | Eighth layer | $Nb_2O_5$ | 2.361 | 14 |
| | Ninth layer | SiON | 1.511 | 31 |
| | Tenth layer | $Nb_2O_5$ | 2.361 | 6 |
| Substrate | | FDS90 | 1.857 | |

Figure 7A:
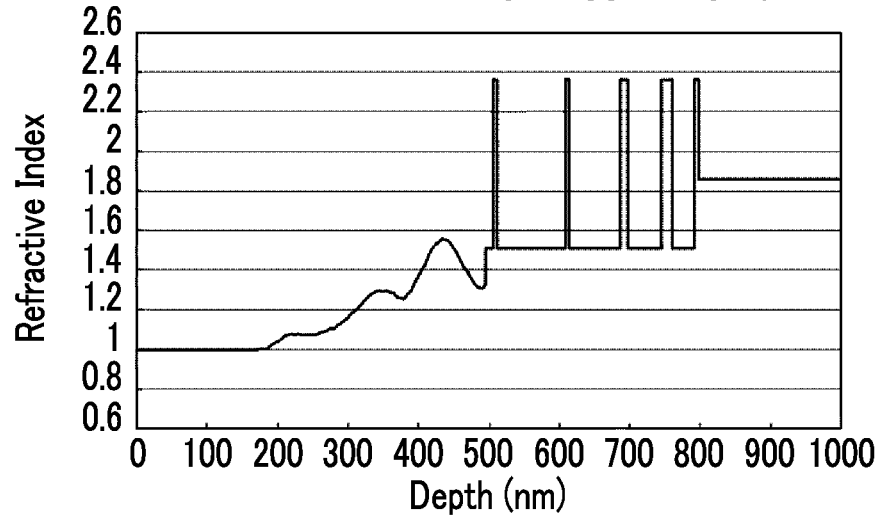
FIG. 7A is a view showing the refractive index distribution of an optical member of Example 6.
Figure 7B:
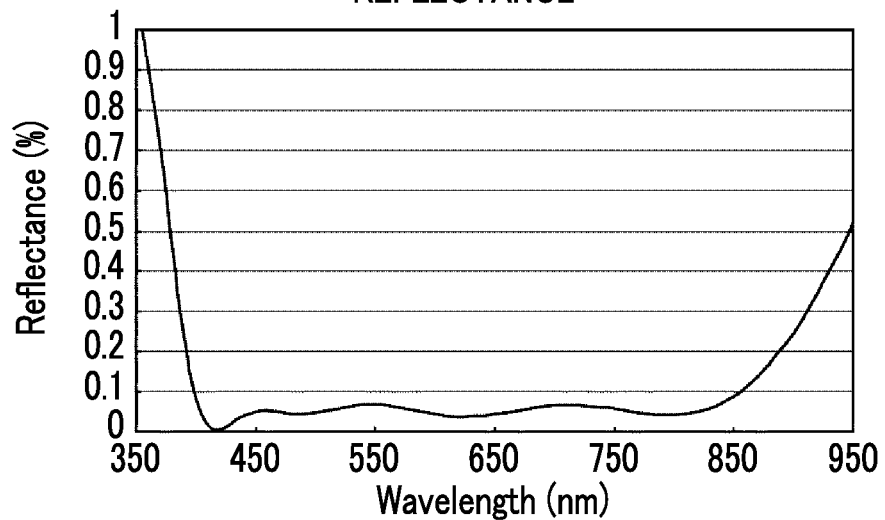
FIG. 7B is a view showing the wavelength dependence of the reflectance of the optical member of Example 6.

The refractive index distribution of the antireflection film of Example 6 in the thickness direction is shown in FIG. 7A, and the wavelength dependence of the reflectance is shown in FIG. 7B. Since the uneven structure layer of Example 6 is prepared under the same conditions as in Example 1, the region of the uneven structure layer in FIG. 7A exhibits the same refractive index distribution as in Example 1.

As shown in FIG. 7B, the antireflection film of Example 6 exhibited a reflectance of 0.4% or less over a band of 540 nm of a wavelength of 390 nm to 930 nm and good antireflection properties were obtained.

Comparative Example 1

An optical member including an antireflection film of Comparative Example 1 was prepared in the same procedures as in the production method of Example 1 except that the intermediate layer had five layers. That is, the intermediate layer had a five-layer structure formed by alternately laminating layers of silicon oxynitride and niobium oxide as shown in Table 7 below.

TABLE 7

COMPARATIVE EXAMPLE 1

| Layer constitution | | Material | Refractive index | Physical film thickness (nm) |
|---|---|---|---|---|
| Uneven structure layer | | $Al_2O_3(H_2O)$ | 1 to 1.772 | 310 |
| Intermediate layer | First layer | SiON | 1.511 | 10 |
| | Second layer | $Nb_2O_5$ | 2.361 | 7 |
| | Third layer | SiON | 1.511 | 69 |

TABLE 7-continued

COMPARATIVE EXAMPLE 1

| Layer constitution | Material | Refractive index | Physical film thickness (nm) |
|---|---|---|---|
| Fourth layer | $Nb_2O_5$ | 2.361 | 11 |
| Fifth layer | SiON | 1.511 | 30 |
| Substrate | FDS90 | 1.857 | |

Figure 8A:
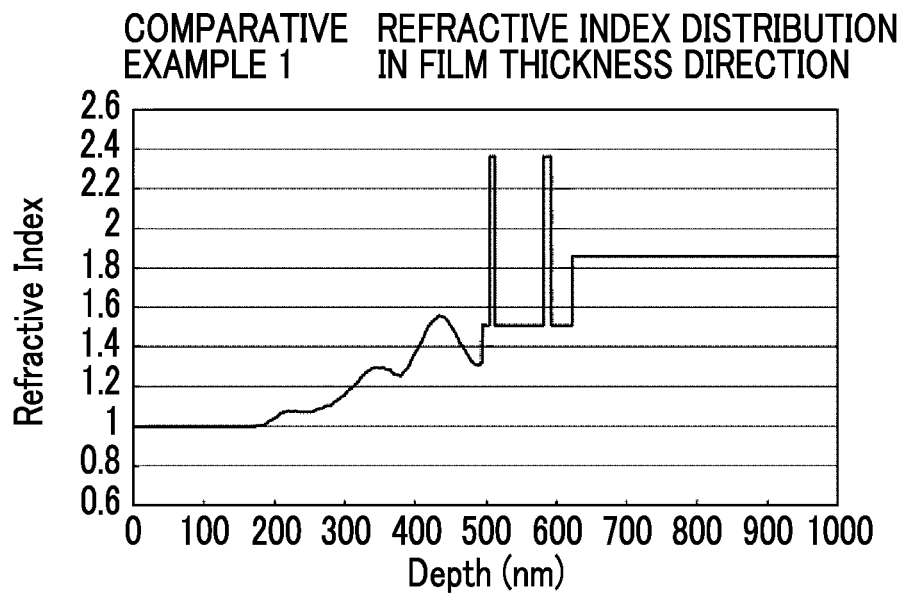
FIG. 8A is a view showing the refractive index distribution of an optical member of Comparative Example 1.
Figure 8B:
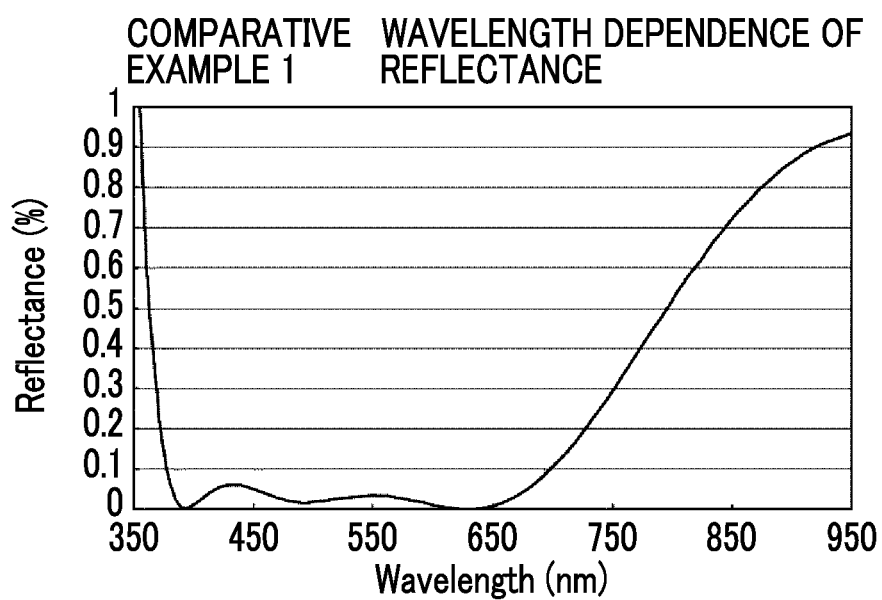
FIG. 8B is a view showing the wavelength dependence of the reflectance of the optical member of Comparative Example 1.

The refractive index distribution of the antireflection film of Comparative Example 1 in the thickness direction is shown in FIG. 8A, and the wavelength dependence of the reflectance is shown in FIG. 8B. Since the uneven structure layer of Comparative Example 1 is prepared under the same conditions as in Example 1, the region of the uneven structure layer in FIG. 8A exhibits the same refractive index distribution as in Example 1.

As shown in FIG. 8B, the antireflection film of Comparative Example 1 exhibited a reflectance of 0.4% or less over a band of 410 nm of a wavelength of 370 nm to 780 nm. Good antireflection properties satisfying a reflectance of 0.4% or less over a bandwidth of 450 nm or more were not obtained.

Comparative Example 2

An optical member including an antireflection film of Comparative Example 2 was prepared in the same procedures as in the production method of Example 1 except that a substrate made of S-LAL18 (manufactured by Ohara Inc.) was used and the intermediate layer had five layers. That is, the intermediate layer had a five-layer structure formed by alternately laminating layers of silicon oxynitride and niobium oxide as shown in Table 8 below.

TABLE 8

COMPARATIVE EXAMPLE 2

| Layer constitution | | Material | Refractive index | Physical film thickness (nm) |
|---|---|---|---|---|
| Uneven structure layer | | $Al_2O_3(H_2O)$ | 1 to 1.772 | 310 |
| Intermediate layer | First layer | SiON | 1.502 | 10 |
| | Second layer | $Nb_2O_5$ | 2.298 | 8 |
| | Third layer | SiON | 1.502 | 69 |
| | Fourth layer | $Nb_2O_5$ | 2.298 | 9 |
| | Fifth layer | SiON | 1.502 | 29 |
| Substrate | | S-LAL18 | 1.733 | |

Figure 9A:
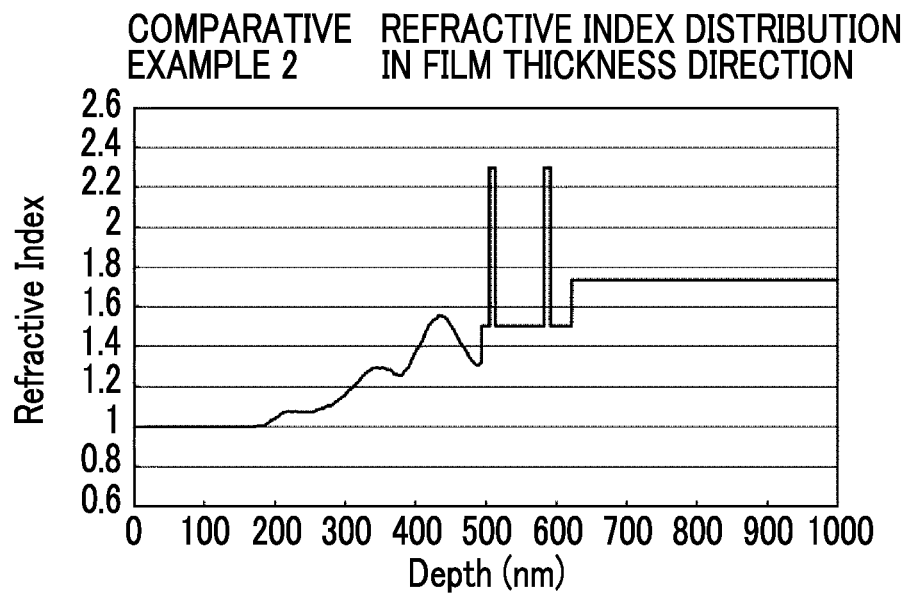
FIG. 9A is a view showing the refractive index distribution of an optical member of Comparative Example 2.
Figure 9B:
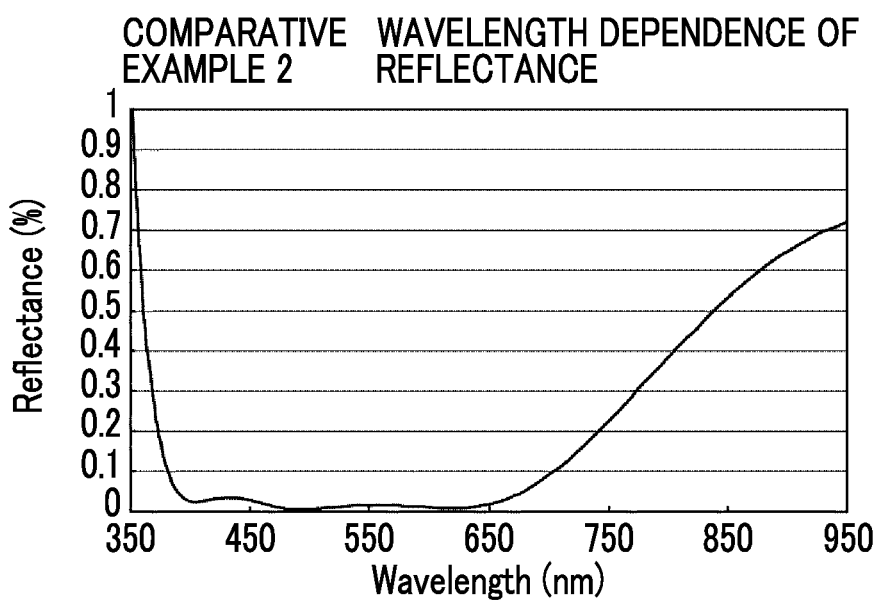
FIG. 9B is a view showing the wavelength dependence of the reflectance of the optical member of Comparative Example 2.

The refractive index distribution of the antireflection film of Comparative Example 2 in the thickness direction is shown in FIG. 9A and the wavelength dependence of the reflectance is shown in FIG. 9B. Since the uneven structure layer of Comparative Example 2 is prepared under the same conditions as in Example 1, the region of the uneven structure layer in FIG. 9A exhibits the same refractive index distribution as in Example 1.

As shown in FIG. 9B, the antireflection film of Comparative Example 2 exhibited a reflectance of 0.4% or less over a band of 440 nm of a wavelength of 370 nm to 810 nm. Good antireflection properties satisfying a reflectance of 0.4% or less over a bandwidth of 450 nm or more were not obtained.

Reference Example 1

An optical member including an antireflection film of Reference Example 1 was prepared in the same procedures as in the production method of Example 1 except that a substrate made of S-NBH5 (manufactured by Ohara Inc.) was used and the intermediate layer had five layers. That is, the intermediate layer had a five-layer structure formed by alternately laminating layers of silicon oxynitride and niobium oxide as shown in Table 9 below.

TABLE 9

Reference Example 1

| Layer constitution | | Material | Refractive index | Physical film thickness (nm) |
|---|---|---|---|---|
| Uneven structure layer | | $Al_2O_3(H_2O)$ | 1 to 1.772 | 310 |
| Intermediate layer | First layer | SiON | 1.511 | 10 |
| | Second layer | $Nb_2O_5$ | 2.361 | 6 |
| | Third layer | SiON | 1.511 | 76 |
| | Fourth layer | $Nb_2O_5$ | 2.361 | 6 |
| | Fifth layer | SiON | 1.511 | 36 |
| Substrate | | S-NBH5 | 1.659 | |

Figure 10A:
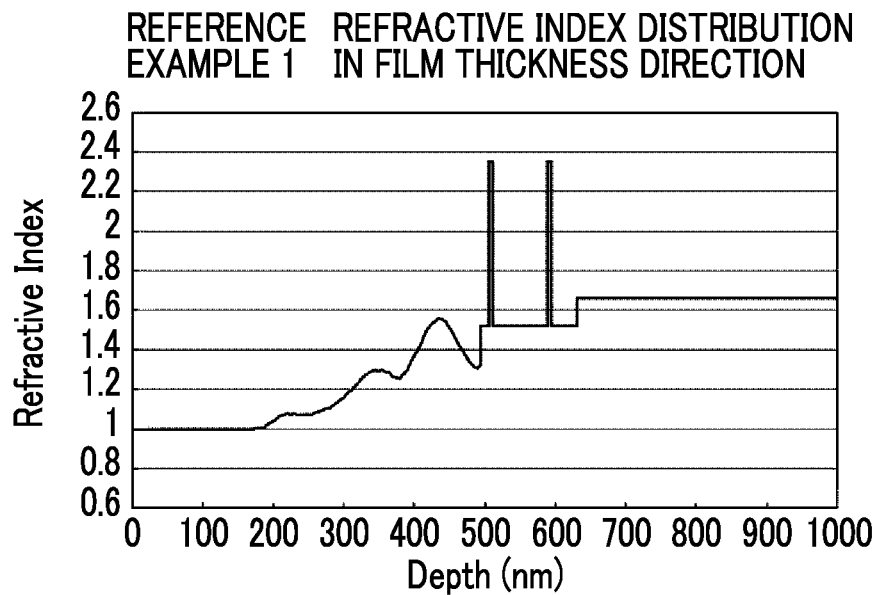
FIG. 10A is a view showing the refractive index distribution of an optical member of Reference Example 1.
Figure 10B:
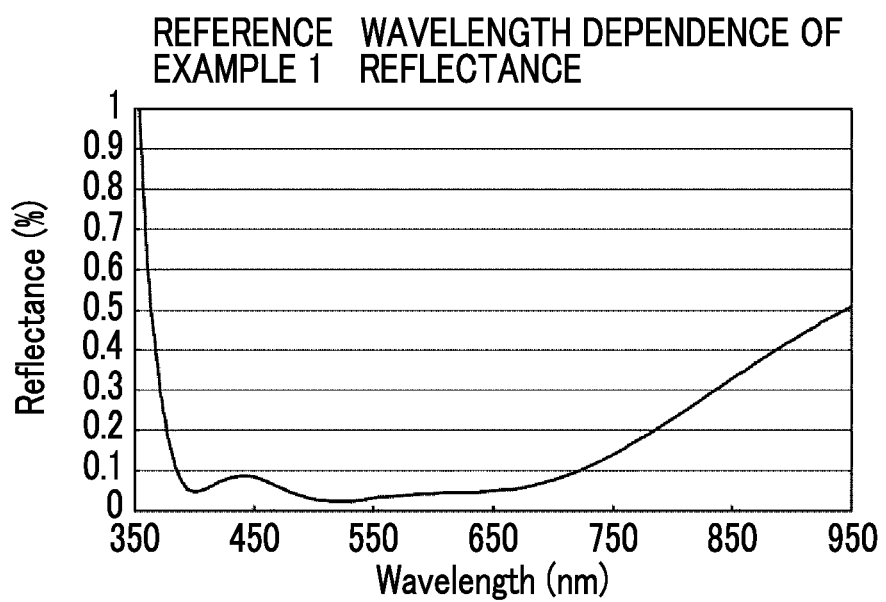
FIG. 10B is a view showing the wavelength dependence of the reflectance of the optical member of Reference Example 1.

The refractive index distribution of the antireflection film of Reference Example 1 in the thickness direction is shown in FIG. 10A and the wavelength dependence of the reflectance is shown in FIG. 10B. Since the uneven structure layer of Reference Example 1 is prepared under the same conditions as in Example 1, the region of the uneven structure layer in FIG. 10A exhibits the same refractive index distribution as in Example 1.

As shown in FIG. 10B, the antireflection film of Reference Example 1 exhibited a reflectance of 0.4% or less over a band of 520 nm of a wavelength of 370 nm to 890 nm, and good antireflection properties were obtained. Here, compared to Examples 1 to 6 above, the substrate has a relatively low refractive index of 1.659. In this manner, it was found that in the case in which the substrate has a relatively low refractive index of 1.659, even when the intermediate layer had five layers, as shown in the example, good antireflection properties were obtained. On the other hand, as shown in Comparative Examples 1 and 2, regarding the substrate having the same refractive index as in Examples 1 to 6, sufficient antireflection properties were not obtained in the intermediate layer having five layers.

Comparative Example 3

An optical member including an antireflection film of Comparative Example 3 was prepared in the same procedures as in the production method of Example 1 except that the film thickness of the aluminum film was set to 40 nm and the intermediate layer had five layers. In Comparative Example 3, the intermediate layer had a five-layer structure formed by alternately laminating layers of silicon oxynitride and niobium oxide as shown in Table 10 below. In addition, the film thickness of the uneven structure layer was assumed to be 280 nm as in Example 3 since the layer was formed under the same conditions as in Example 3 above.

TABLE 10

COMPARATIVE EXAMPLE 3

| Layer constitution | | Material | Refractive index | Physical film thickness (nm) |
|---|---|---|---|---|
| Uneven structure layer | | $Al_2O_3(H_2O)$ | 1 to 1.77168 | 280 |
| Intermediate layer | First layer | SiON | 1.511 | 10 |
| | Second layer | $Nb_2O_5$ | 2.361 | 6 |
| | Third layer | SiON | 1.511 | 71 |
| | Fourth layer | $Nb_2O_5$ | 2.361 | 11 |
| | Fifth layer | SiON | 1.511 | 27 |
| Substrate | | FDS90 | 1.857 | |

Figure 11A:
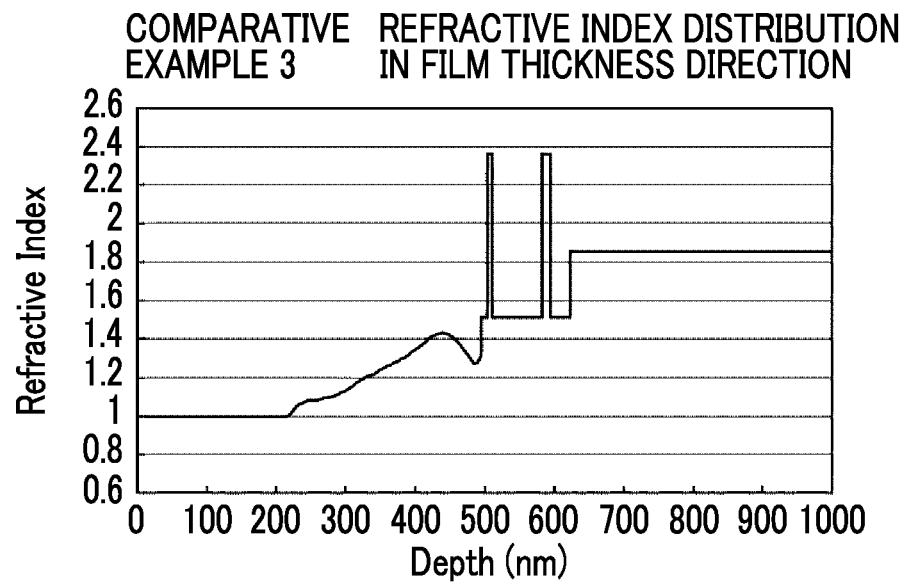
FIG. 11A is a view showing the refractive index distribution of an optical member of Comparative Example 3.
Figure 11B:
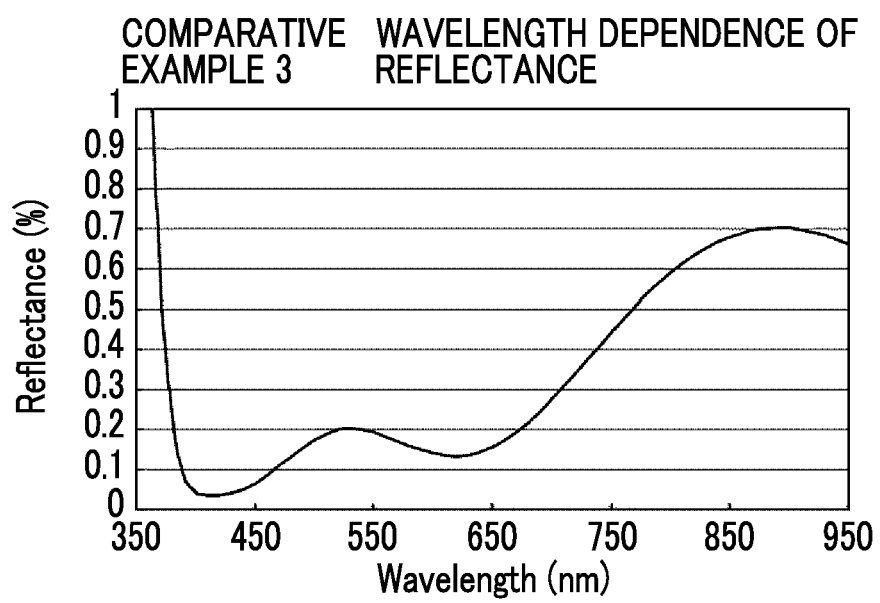
FIG. 11B is a view showing the wavelength dependence of the reflectance of the optical member of Comparative Example 3.

The refractive index distribution of the antireflection film of Comparative Example 3 in the thickness direction is shown in FIG. 11A and the wavelength dependence of the reflectance is shown in FIG. 11B. Since the uneven structure layer of Comparative Example 3 is prepared under the same conditions as in Example 3, the region of the uneven structure layer in FIG. 11A exhibits the same refractive index distribution as in Example 3.

As shown in FIG. 11B, the antireflection film of Comparative Example 3 exhibited a reflectance of 0.4% or less over a band of 360 nm of a wavelength of 380 nm to 740 nm, and good antireflection properties were obtained. Good antireflection properties satisfying a reflectance of 0.4% or less over a bandwidth of 450 nm or more were not obtained.

Comparative Example 4

An optical member including an antireflection film of Comparative Example 4 was prepared in the same procedures as in the production method of Example 1 except that the film thickness of the aluminum film was set to 30 nm and the intermediate layer had five layers. That is, the intermediate layer had a five-layer structure formed by alternately laminating layers of silicon oxynitride and niobium oxide as shown in Table 11 below. In Comparative Example 4, the film thickness of the uneven structure layer was 240 nm when the film thickness of the uneven structure layer was measured under the same conditions as in Example 1.

TABLE 11

COMPARATIVE EXAMPLE 4

| Layer constitution | | Material | Refractive index | Physical film thickness (nm) |
|---|---|---|---|---|
| Uneven structure layer | | $Al_2O_3(H_2O)$ | 1 to 1.772 | 240 |
| Intermediate layer | First layer | SiON | 1.511 | 10 |
| | Second layer | $Nb_2O_5$ | 2.361 | 7 |
| | Third layer | SiON | 1.511 | 78 |
| | Fourth layer | $Nb_2O_5$ | 2.361 | 13 |
| | Fifth layer | SiON | 1.511 | 28 |
| Substrate | | FDS90 | 1.857 | |

Figure 12A:
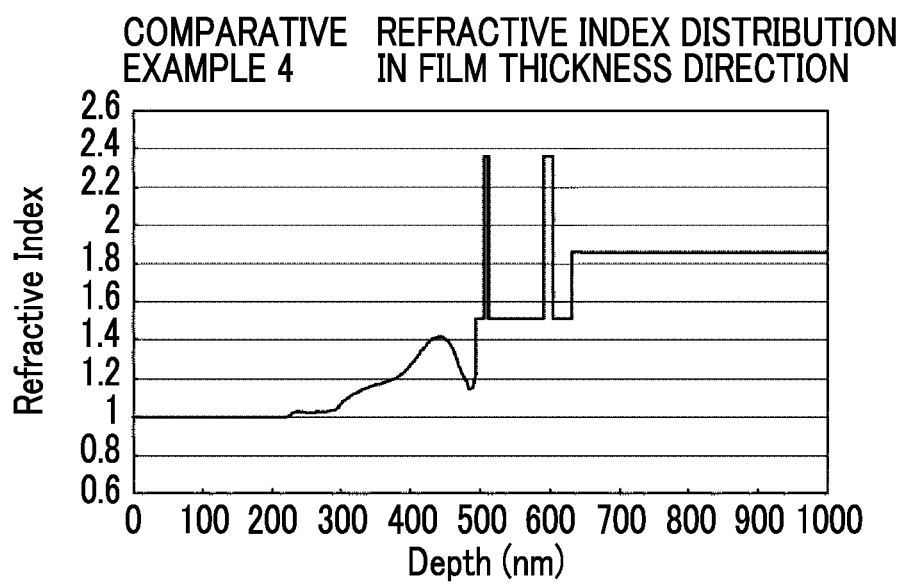
FIG. 12A is a view showing the refractive index distribution of an optical member of Comparative Example 4.
Figure 12B:
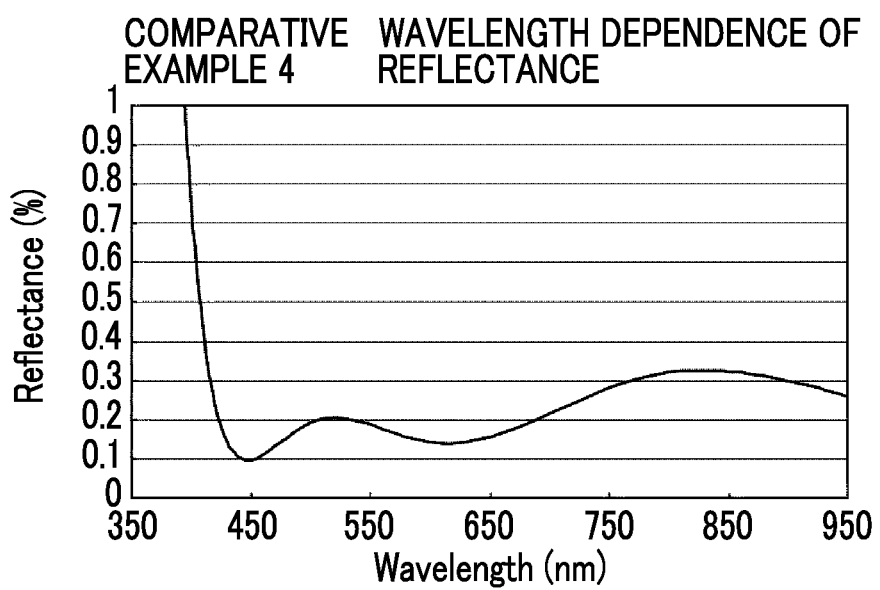
FIG. 12B is a view showing the wavelength dependence of the reflectance of the optical member of Comparative Example 4.

The refractive index distribution of the antireflection film of Comparative Example 4 in the thickness direction is shown in FIG. 12A and the wavelength dependence of the reflectance is shown in FIG. 12B. The refractive index distribution of the uneven structure layer of Comparative Example 4 in the thickness direction was obtained by subjecting a sample obtained by forming a thin aluminum film having a thickness of 30 nm on the silicon substrate and treating the film with hot water under the same condition of the comparative example to ellipsometry and reflectance measurement.

The refractive index distribution of the uneven structure layer of Comparative Example 4 also exhibits a profile in which the refractive index gradually increases from the surface side to the substrate side, the maximum peak is exhibited in a region from the center in the thickness direction to the interface with the intermediate layer, and the refractive index decreases toward the interface.

As shown in FIG. 12B, the antireflection film of Comparative Example 4 exhibited a reflectance of 0.4% or less over a band of 530 nm or more exceeding a wavelength of 420 nm to a measurement upper limit of 950 nm and good antireflection properties satisfying a reflectance of 0.4% or less over a very wide range were obtained.

Comparative Example 5

An optical member including an antireflection film of Comparative Example 5 was prepared in the same procedures as in the production method of Example 1 except that the film thickness of the aluminum film was set to 20 nm and the intermediate layer had five layers. That is, the intermediate layer had a five-layer structure formed by alternately laminating layers of silicon oxynitride and niobium oxide as shown in Table 12 below. In Comparative Example 5, the film thickness of the uneven structure layer was 210 nm when the film thickness was measured in the same manner as in Example 1.

TABLE 12

COMPARATIVE EXAMPLE 5

| Layer constitution | | Material | Refractive index | Physical film thickness (nm) |
|---|---|---|---|---|
| Uneven structure layer | | $Al_2O_3(H_2O)$ | 1 to 1.772 | 210 |
| Intermediate layer | First layer | SiON | 1.511 | 10 |
| | Second layer | $Nb_2O_5$ | 2.361 | 6 |
| | Third layer | SiON | 1.511 | 66 |
| | Fourth layer | $Nb_2O_5$ | 2.361 | 11 |
| | Fifth layer | SiON | 1.511 | 18 |
| Substrate | | FDS90 | 1.857 | |

Figure 13A:
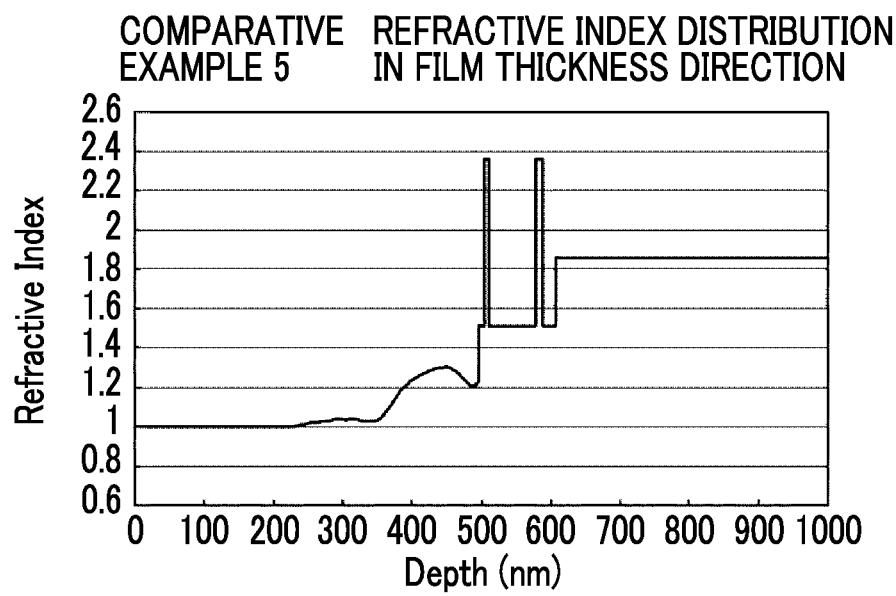
FIG. 13A is a view showing the refractive index distribution of an optical member of Comparative Example 5.
Figure 13B:
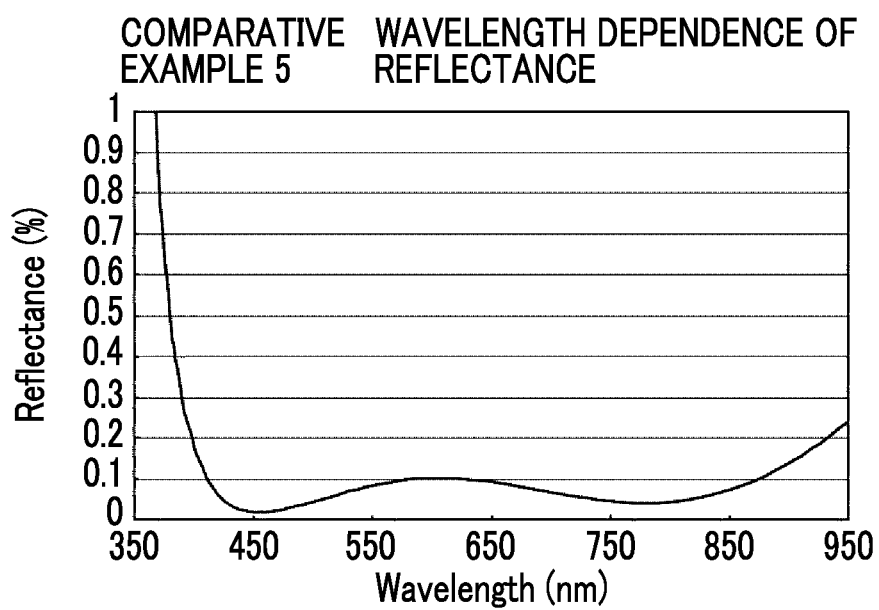
FIG. 13B is a view showing the wavelength dependence of the reflectance of the optical member of Comparative Example 5.

The refractive index distribution of the antireflection film of Comparative Example 5 in the thickness direction is shown in FIG. 13A and the wavelength dependence of the reflectance is shown in FIG. 13B. The refractive index distribution of the uneven structure layer of Comparative Example 5 in the thickness direction was obtained by subjecting a sample obtained by forming a thin aluminum film having a thickness of 20 nm on the silicon substrate and treating the film with hot water under the same condition of the comparative example to ellipsometry and reflectance measurement.

The refractive index distribution of the uneven structure layer of Comparative Example 5 also exhibits a profile in which the refractive index gradually increases from the surface side to the substrate side, the maximum peak is exhibited in a region from the center in the thickness direction to the interface with the intermediate layer, and the refractive index decreases toward the interface.

As shown in FIG. 13B, the antireflection film of Comparative Example 5 exhibited a reflectance of 0.4% or less over a region of 560 nm or more exceeding of a wavelength of 390 nm to a measurement upper limit of 950 nm and good antireflection properties satisfying a reflectance of 0.4% or less over a very wide range were obtained.

A durability test was carried out on the antireflection films of Examples 1 to 6, Comparative Examples 1 to 5, and Reference Example 1 above and changes in the wavelength dependence of the reflectance before and after the durability test were measured.

For the durability test, an operation in which the optical member of each of Examples and Comparative Examples was kept at −40° C. for 1 hour and kept at +85° C. for 1 hour was carried out 24 cycles. Before and after the durability test, the wavelength dependence of the reflectance was measured and when a change in the wavelength dependence of the reflectance before and after the durability test in a wavelength range of a wavelength of 400 nm to 780 nm was 0.1% or less, it was evaluated as "not changed", that is, good durability. When there was any one place in which a change in reflectance of more than 0.1%, it was evaluated as "changed", that is, low durability.

Figure 14:
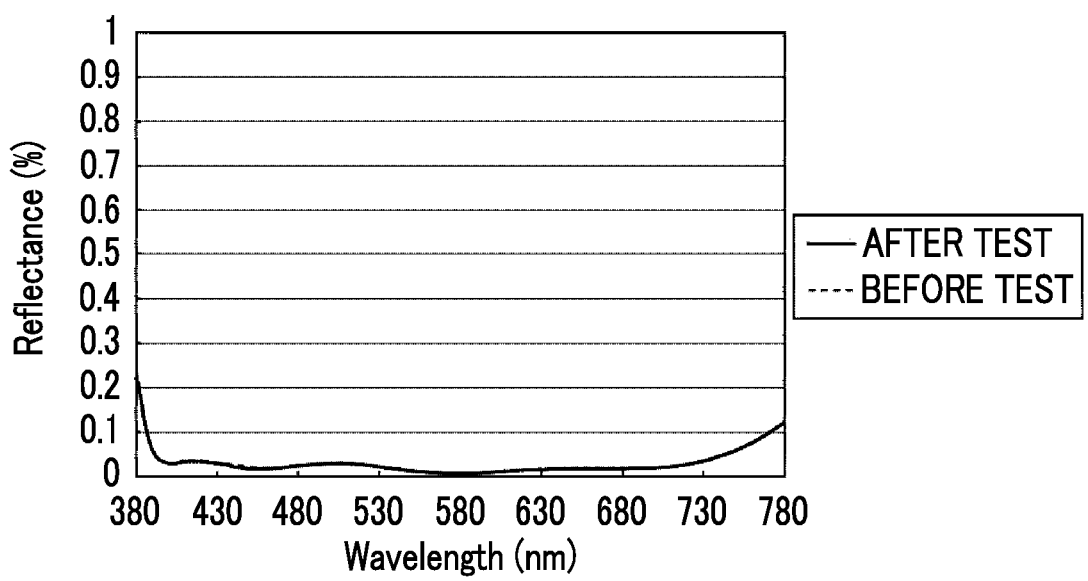
FIG. 14 is a view showing the wavelength dependence of the reflectance of Example 1 before and after a durability test.
Figure 15:
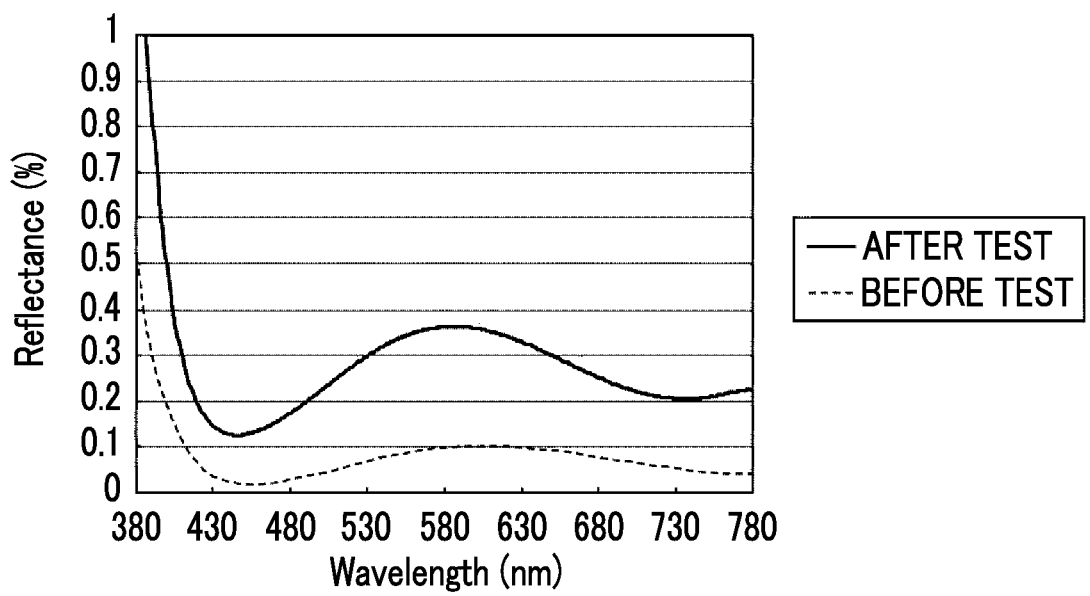
FIG. 15 is a view showing the wavelength dependence of the reflectance of Comparative Example 5 before and after a durability test.
Figure 16:
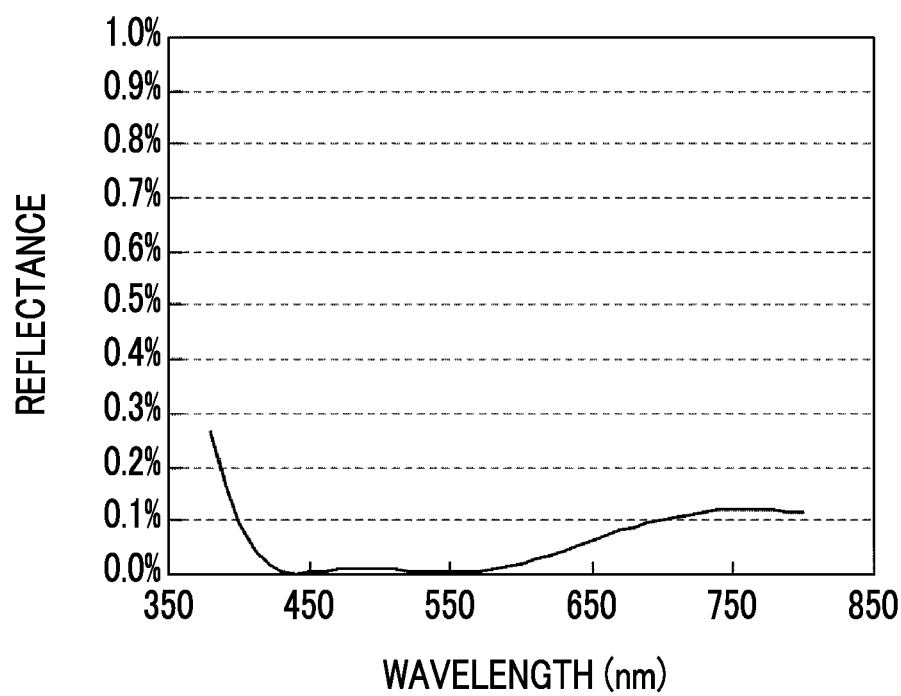
FIG. 16 is a view showing the wavelength dependence of the reflectance of an antireflection film including an uneven structure layer obtained by boehmitization of an alumina film.
Figure 17:
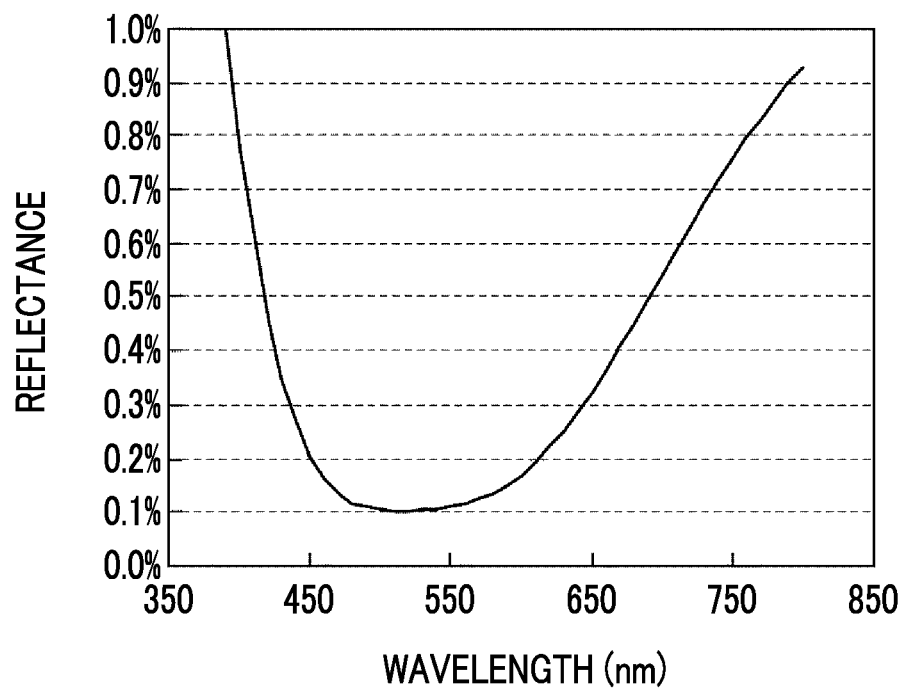
FIG. 17 is a view showing the wavelength dependence of the reflectance of an antireflection film including an uneven structure layer obtained by boehmitization of an aluminum film.
Figure 18:
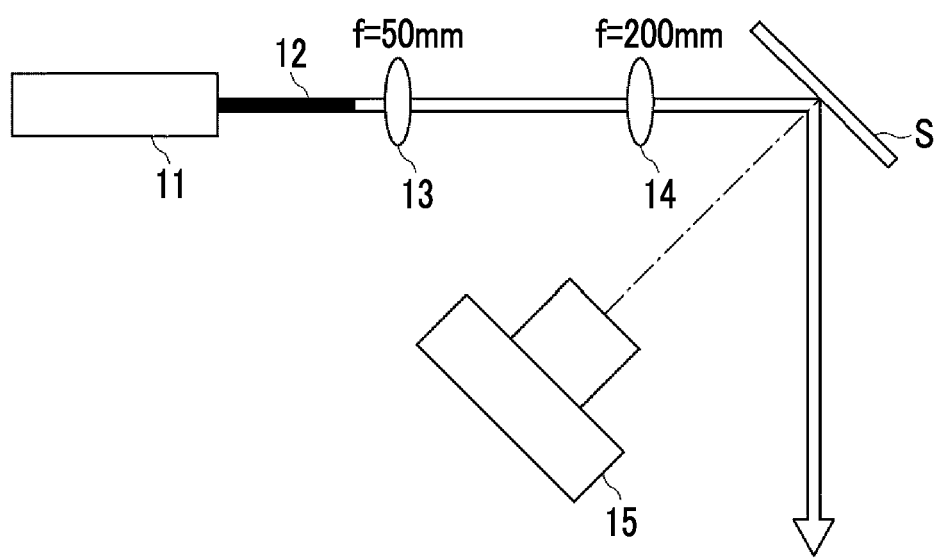
FIG. 18 is an illustration of a method of measuring scattered light.

As an example of the measurement result, the wavelength dependence of the reflectance of Example 1 before and after the durability test is shown in FIG. 14 and the wavelength dependence of the reflectance of Comparative Example 5 before and after the durability test is shown in FIG. 15.

As shown in FIG. 14, regarding Example 1, a change in profile before and after the durability test was not significant and a change in reflectance was 0.1% or less. On the other hand, in Comparative Example 5, it is found that the reflectance apparently increases over the entire measurement region after the test and the maximum change amount of the reflectance is more than 0.2%.

In Table 13, the main constitutions and the results of the durability test of Examples 1 to 6, Comparative Examples 1 to 5, and Reference Example 1 are collectively shown.

bility was deteriorated. On the other hand, it was found that in all examples in which the film thickness of the uneven structure layer was 280 nm or more, the results of the durability test were "Not changed" and good durability was obtained.

In all Examples and Comparative Examples, since the uneven structure layer is formed by treating the thin aluminum film with hot water, an uneven structure having a spatial frequency peak value of 6.5 $\mu m^{-1}$ is obtained and accordingly, an antireflection film that can sufficiently suppress scattered light can be obtained.

EXPLANATION OF REFERENCES

1: optical member
2: transparent substrate
3: antireflection film
5: intermediate layer
10: uneven structure layer
51: first layer
52: second layer
53: third layer
54: fourth layer
55: fifth layer
56: sixth layer
57: seventh layer
58: eighth layer

What is claimed is:
1. An antireflection film that is provided on a surface of a substrate, the film comprising:
an uneven structure layer that has an uneven structure in which a distance between protrusions is shorter than a wavelength of light of which reflection is to be sup-

TABLE 13

|  | Substrate | Reflective index of substrate | Al film thickness (nm) | Film thickness of uneven structure (nm) | Intermediate layer | Bandwidth of reflectance of 0.4% or less (nm) | Durability test |
|---|---|---|---|---|---|---|---|
| Example 1 | FDS90 | 1.857 | 50 | 310 | 8 | 470 | Not changed |
| Example 2 | LAL18 | 1.733 | 50 | 310 | 8 | 510 | Not changed |
| Example 3 | FDS90 | 1.857 | 40 | 280 | 8 | 450 | Not changed |
| Example 4 | FDS90 | 1.857 | 50 | 310 | 8 | 480 | Not changed |
| Example 5 | FDS90 | 1.857 | 50 | 310 | 9 | 550 | Not changed |
| Example 6 | FDS90 | 1.857 | 50 | 310 | 10 | 540 | Not changed |
| Comparative Example 1 | FDS90 | 1.857 | 50 | 310 | 5 | 410 | Not changed |
| Comparative Example 2 | LALI8 | 1,733 | 50 | 310 | 5 | 440 | Not changed |
| Comparative Example 3 | FDS90 | 1.857 | 40 | 280 | 5 | 360 | Not changed |
| Comparative Example 4 | FDS90 | 1.857 | 30 | 240 | 5 | 530 or more | Changed |
| Comparative Example 5 | FDS90 | 1.857 | 20 | 210 | 5 | 560 or more | Changed |
| Reference Example 1 | NBH5 | 1.659 | 50 | 310 | 5 | 520 | Not changed |

As shown in Table 13, it was found that in Comparative Examples 4 and 5 in which the film thicknesses of the uneven structure layers each were 240 nm and 210 nm, the results of the durability test were "Changed" and the durapressed, and that has an alumina hydrate as a main component; and
an intermediate layer that is disposed between the uneven structure layer and the substrate, wherein:

the uneven structure layer has a spatial frequency peak value of the uneven structure of 6.5 $\mu m^{-1}$ or greater and has a film thickness of 250 nm or more, the uneven structure layer exhibits a profile in which a refractive index of the uneven structure layer in a film thickness direction gradually increases from a surface side, a maximum peak is exhibited in a region from a center of the uneven structure layer in the film thickness direction to an interface with the intermediate layer, and the refractive index gradually decreases toward the interface to a refractive index that is at least 10% smaller than the maximum peak, the intermediate layer comprises a plurality of layers including at least a first layer, a second layer, a third layer, a fourth layer, a fifth layer, a sixth layer, a seventh layer, and an eighth layer in this order from the uneven structure layer side to the substrate side, the first layer has a refractive index of 1.42 or more and less than 1.7 and a film thickness of 2 nm or more and 20 nm or less, the second layer has a refractive index of 1.7 or more and 2.7 or less and a film thickness of 2 nm or more and 30 nm or less, the third layer has a refractive index of 1.42 or more and less than 1.7 and a film thickness of 10 nm or more and 200 nm or less, the fourth layer has a refractive index of 1.7 or more and 2.7 or less and a film thickness of 2 nm or more and 30 nm or less, the fifth layer has a refractive index of 1.42 or more and less than 1.7 and a film thickness of 10 nm or more and 200 nm or less, the sixth layer has a refractive index of 1.7 or more and 2.7 or less and a film thickness of 2 nm or more and 30 nm or less, the seventh layer has a refractive index of 1.42 or more and less than 1.7 and a film thickness of 10 nm or more and 200 nm or less, and the eighth layer has a refractive index of 1.7 or more and 2.7 or less and a film thickness of 2 nm or more and 30 nm or less.

2. The antireflection film according to claim 1, wherein:
the intermediate layer further includes a ninth layer on the substrate side of the eighth layer, and
the ninth layer has a refractive index of 1.42 or more and less than 1.7 and a film thickness of 10 nm or more and 200 nm or less.

3. The antireflection film according to claim 2, wherein:
the intermediate layer further includes a tenth layer on the substrate side of the ninth layer, and
the tenth layer has a refractive index of 1.7 or more and 2.7 or less and a film thickness of 2 nm or more and 30 nm or less.

4. The antireflection film according to claim 1, wherein the first layer is made of silicon oxide or silicon oxynitride.

5. The antireflection film according to claim 1, wherein the second layer is made of niobium oxide.

6. The antireflection film according to claim 1, wherein odd-numbered layers among the plurality of layers constituting the intermediate layer are formed of the same material.

7. The antireflection film according to claim 1, wherein even-numbered layers among the plurality of layers constituting the intermediate layer are formed of the same material.

8. An optical member comprising:
the antireflection film according to claim 1; and
a transparent substrate having a surface on which the antireflection film is formed.

9. The optical member according to claim 8, wherein a refractive index of the transparent substrate is 1.73 or more.

10. An antireflection film that is provided on a surface of a substrate, the film comprising:
an uneven structure layer that has an uneven structure in which a distance between protrusions is shorter than a wavelength of light of which reflection is to be suppressed, and that has an alumina hydrate as a main component; and
an intermediate layer that is disposed between the uneven structure layer and the substrate, wherein:
the uneven structure layer is obtained by treating an aluminum film with hot water and has a film thickness of 250 nm or more,
the uneven structure layer exhibits a profile in which a refractive index of the uneven structure layer in a film thickness direction gradually increases from a surface side, a maximum peak is exhibited in a region from a center of the uneven structure layer in the film thickness direction to an interface with the intermediate layer, and the refractive index gradually decreases toward the interface to a refractive index that is at least 10% smaller than the maximum peak,
the intermediate layer comprises a plurality of layers including at least a first layer, a second layer, a third layer, a fourth layer, a fifth layer, a sixth layer, a seventh layer, and an eighth layer in this order from the uneven structure layer side to the substrate side,
the first layer has a refractive index of 1.42 or more and less than 1.7 and a film thickness of 2 nm or more and 20 nm or less,
the second has a refractive index of 1.7 or more and 2.7 or less and a film thickness of 2 nm or more and 30 nm or less,
the third layer has a refractive index of 1.42 or more and less than 1.7 and a film thickness of 10 nm or more and 200 nm or less,
the fourth has a refractive index of 1.7 or more and 2.7 or less and a film thickness of 2 nm or more and 30 nm or less,
the fifth layer has a refractive index of 1.42 or more and less than 1.7 and a film thickness of 10 nm or more and 200 nm or less,
the sixth layer has a refractive index of 1.7 or more and 2.7 or less and a film thickness of 2 nm or more and 30 nm or less,
the seventh layer has a refractive index of 1.42 or more and less than 1.7 and a film thickness of 10 nm or more and 200 nm or less, and
the eighth layer has a refractive index of 1.7 or more and 2.7 or less and a film thickness of 2 nm or more and 30 nm or less.

11. The antireflection film according to claim 10, wherein:
the intermediate layer further includes a ninth layer on the substrate side of the eighth layer, and
the ninth layer has a refractive index of 1.42 or more and less than 1.7 and a film thickness of 10 nm or more and 200 nm or less.

12. The antireflection film according to claim 11, wherein:
the intermediate layer further includes a tenth layer on the substrate side of the ninth layer, and the tenth layer has a refractive index of 1.7 or more and 2.7 or less and a film thickness of 2 nm or more and 30 nm or less.

13. The antireflection film according to claim 10, wherein the first layer is made of silicon oxide or silicon oxynitride.

14. The antireflection film according to claim 10, wherein the second layer is made of niobium oxide.

15. The antireflection film according to claim 10, wherein odd-numbered layers among the plurality of layers constituting the intermediate layer are formed of the same material.

16. The antireflection film according to claim 10, wherein even-numbered layers among the plurality of layers constituting the intermediate layer are formed of the same material.

17. An optical member comprising:
the antireflection film according to claim 10; and
a transparent substrate having a surface on which the antireflection film is formed.

18. The optical member according to claim 17, wherein a refractive index of the transparent substrate is 1.73 or more.

* * * * *